United States Patent
Suh et al.

(10) Patent No.: US 12,332,837 B2
(45) Date of Patent: Jun. 17, 2025

(54) SORTING THE NODES OF AN OPERATION UNIT GRAPH FOR IMPLEMENTATION IN A RECONFIGURABLE PROCESSOR

(71) Applicant: SambaNova Systems, Inc., Palo Alto, CA (US)

(72) Inventors: Hong Suh, Palo Alto, CA (US); Sumti Jairath, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 35 days.

(21) Appl. No.: 18/225,856

(22) Filed: Jul. 25, 2023

(65) Prior Publication Data

US 2024/0037061 A1 Feb. 1, 2024

Related U.S. Application Data

(60) Provisional application No. 63/392,364, filed on Jul. 26, 2022, provisional application No. 63/392,374, (Continued)

(51) Int. Cl.
*G06F 15/80* (2006.01)
*G06F 9/30* (2018.01)
(Continued)

(52) U.S. Cl.
CPC .......... *G06F 15/80* (2013.01); *G06F 9/30036* (2013.01); *G06F 9/3836* (2013.01); *G06F 15/7871* (2013.01)

(58) Field of Classification Search
CPC .... G06F 15/80; G06F 9/30036; G06F 9/3836; G06F 15/7871; G06F 9/5066
See application file for complete search history.

(56) References Cited

U.S. PATENT DOCUMENTS 10,872,057 B1 * 12/2020 Rawat ................. G06F 15/7807
11,232,156 B1 * 1/2022 Wang ..................... G06N 3/047
(Continued)

FOREIGN PATENT DOCUMENTS

WO    2010142987 A1    12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Faisal M Zaman
(74) *Attorney, Agent, or Firm* — Flagship Patents; Sikander M. Khan; Joachim Erhard Pistof

(57) ABSTRACT

A sorting tool for determining an ordered sequence of nodes in an operation unit graph for placing and routing the operation unit graph onto a reconfigurable processor is presented as well as a method of operating a sorting tool for determining an ordered sequence of nodes in an operation unit graph for placing and routing the operation unit graph onto a reconfigurable processor. The sorting tool is configured to receive the operation unit graph including a set of unsorted nodes and edges that interconnect nodes in the set of unsorted nodes, determine an ordered sequence of the nodes in the operation unit graph, and provide the ordered sequence of nodes for the placing and routing of the operation unit graph onto the reconfigurable processor.

20 Claims, 16 Drawing Sheets

Related U.S. Application Data filed on Jul. 26, 2022, provisional application No. 63/392,368, filed on Jul. 26, 2022.

(51) Int. Cl.
  *G06F 9/38* (2018.01)
  *G06F 15/78* (2006.01)

(56) References Cited

U.S. PATENT DOCUMENTS

| | | | | |
|---|---|---|---|---|
| 11,934,887 | B1* | 3/2024 | Wang | G06F 8/41 |
| 2018/0165400 | A1* | 6/2018 | Feld | G06F 30/18 |
| 2018/0167289 | A1* | 6/2018 | Beyer | H04L 43/045 |
| 2019/0370407 | A1* | 12/2019 | Dickie | G06F 8/433 |
| 2022/0222584 | A1* | 7/2022 | Nimmagadda | G06N 20/00 |
| 2022/0414054 | A1* | 12/2022 | Parra | G06F 15/8046 |
| 2023/0153567 | A1* | 5/2023 | Keski-Valkama | G06N 3/04 |
| | | | | 706/15 |
| 2023/0297651 | A1* | 9/2023 | Mehta | G06N 20/00 |
| | | | | 382/181 |
| 2023/0376569 | A1* | 11/2023 | Ushijima-Mwesigwa | |
| | | | | G06F 17/11 |
| 2023/0385641 | A1* | 11/2023 | Farsarakis | G06N 3/048 |
| 2024/0163171 | A1* | 5/2024 | Bernardo de Oliveira | |
| | | | | H04L 41/0806 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

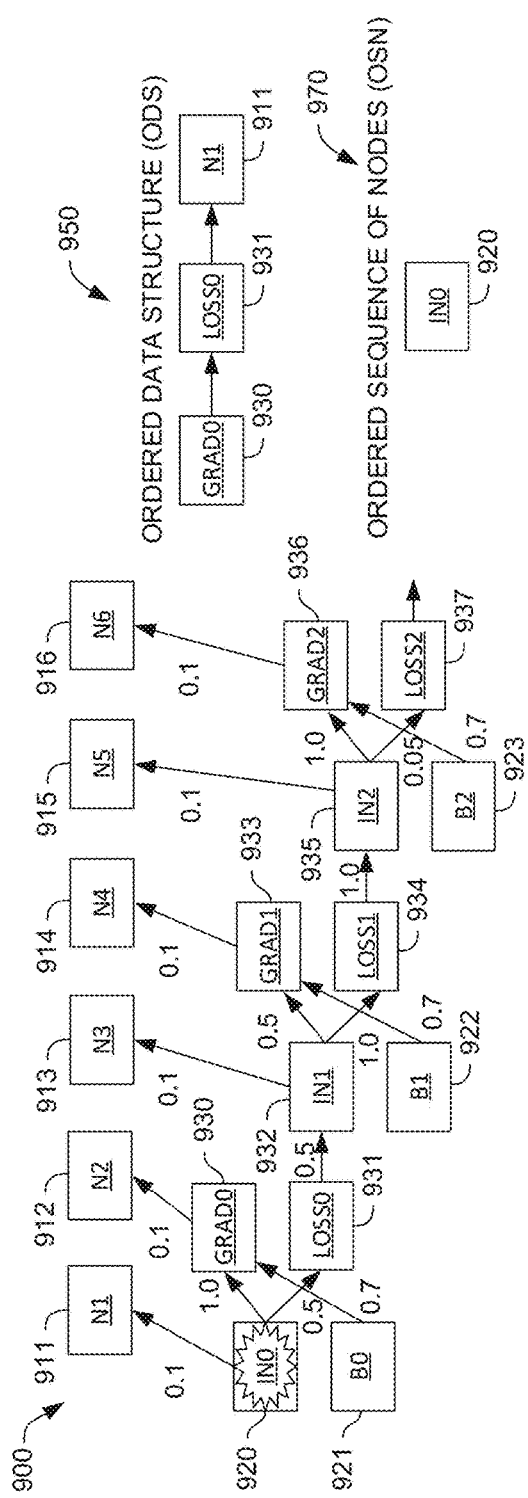
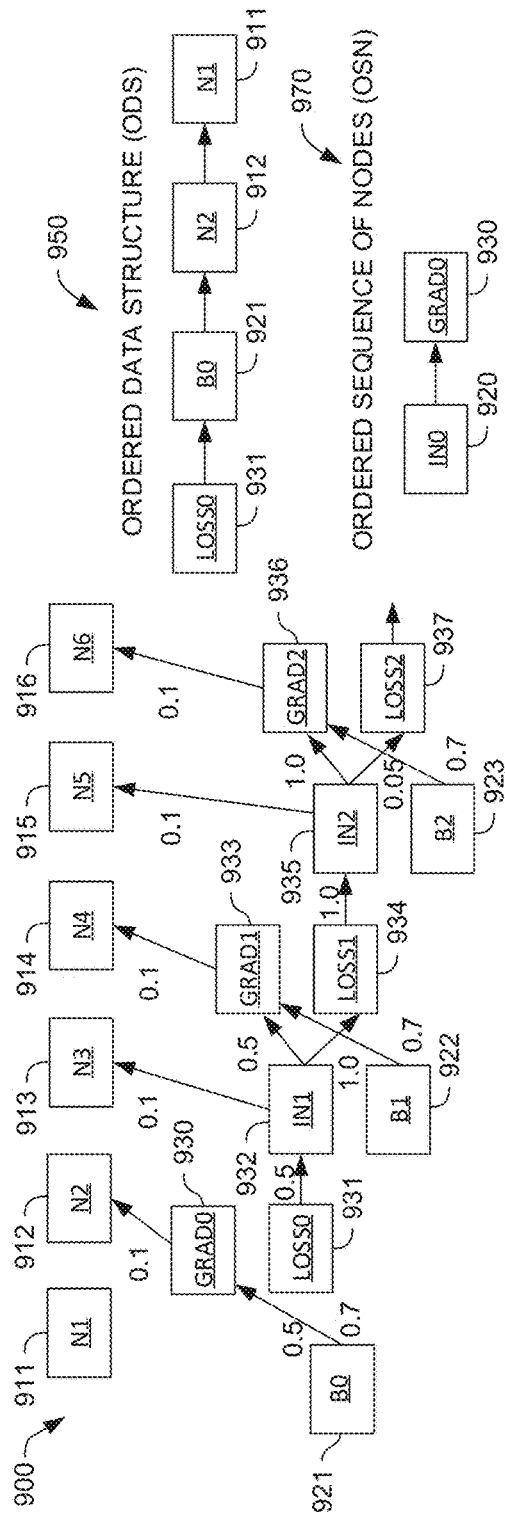
FIG. 9A
FIG. 9B

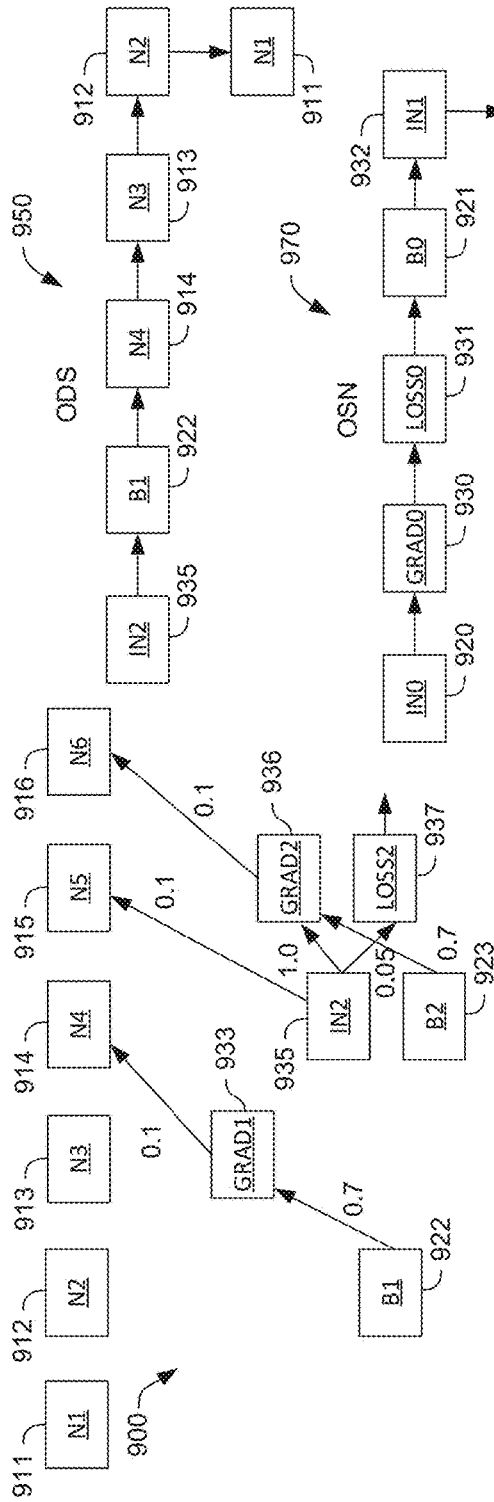
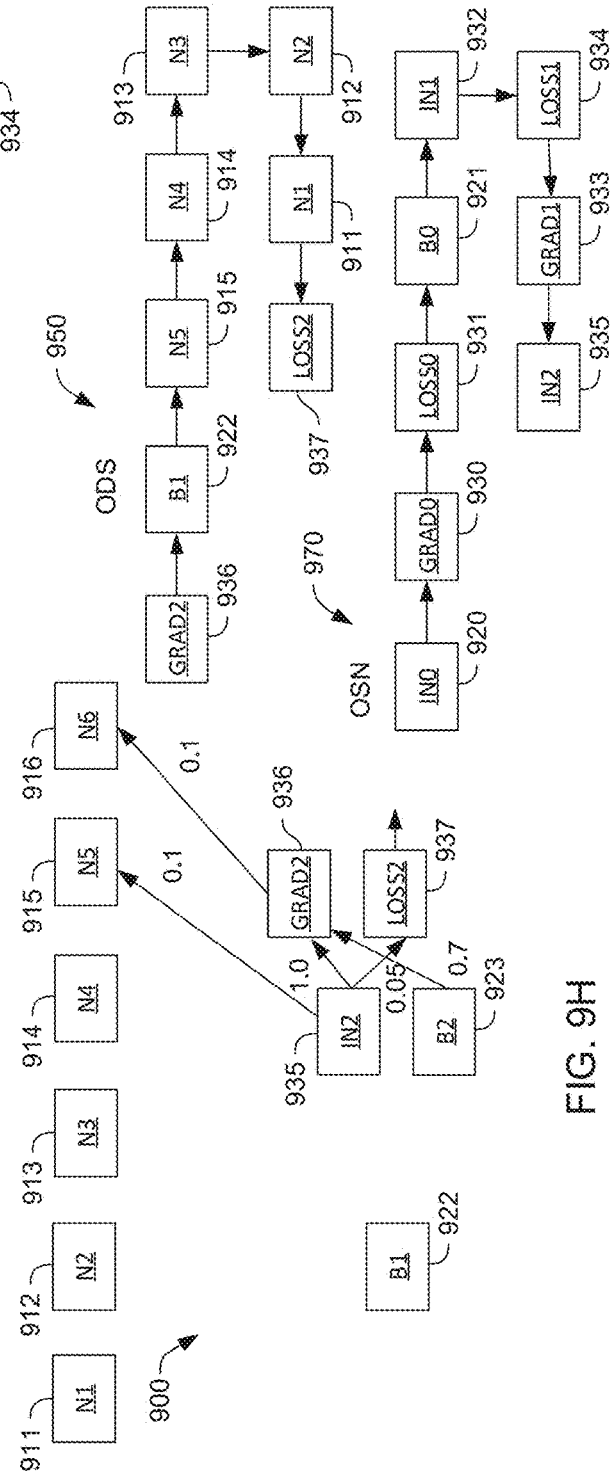
FIG. 9G
FIG. 9H

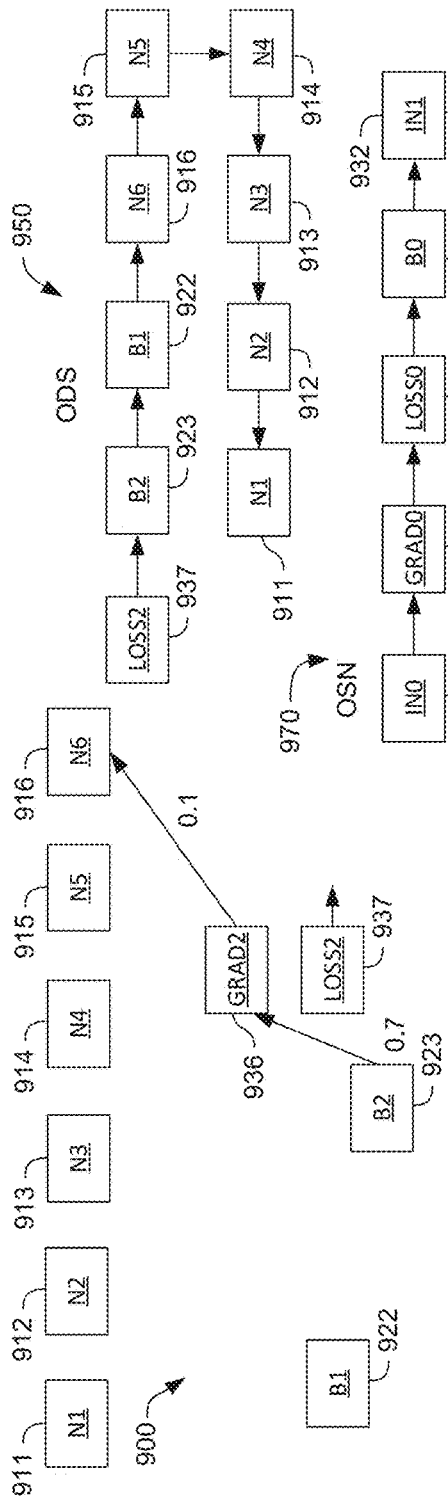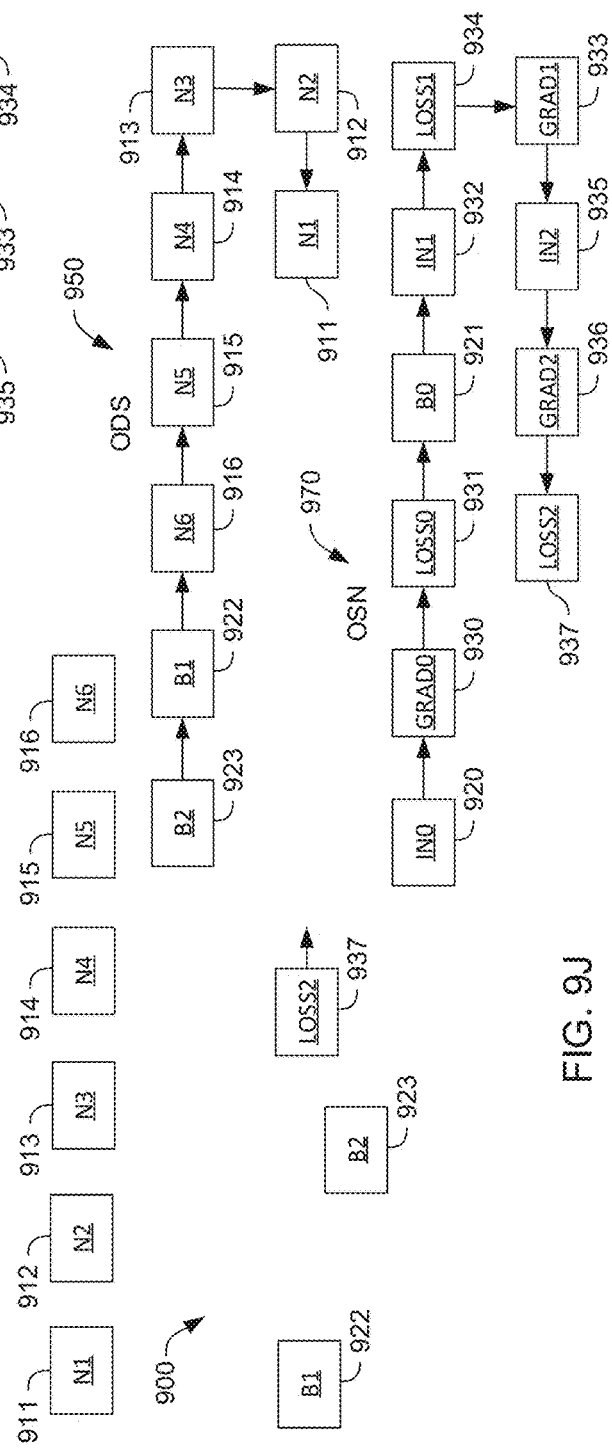
FIG. 9I
FIG. 9J

SORTING THE NODES OF AN OPERATION UNIT GRAPH FOR IMPLEMENTATION IN A RECONFIGURABLE PROCESSOR

RELATED APPLICATIONS AND DOCUMENTS

This application claims the benefit of U.S. Provisional Patent Application No. 63/392,364, entitled, "Sorting the Nodes of an Operation Unit Graph for Implementation in a Reconfigurable Processor" filed on 26 Jul. 2022, the benefit of U.S. Provisional Application No. 63/392,368, entitled, "A Placement Method Based on a Sorted Operation Unit Graph for an Iterative Placement and Routing on a Reconfigurable Processor" filed on 26 Jul. 2022, and the benefit of U.S. Provisional Patent Application No. 63/392,374, entitled, "Routing Method Based on a Sorted Operation Unit Graph for an Iterative Placement and Routing on a Reconfigurable Processor" filed on 26 Jul. 2022. These provisional applications are hereby incorporated by reference for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239, 252, now U.S. Pat. No. 10,698,853 B1, filed Jan. 3, 2019, entitled "VIRTUALIZATION OF A RECONFIGURABLE DATA PROCESSOR;"

U.S. Nonprovisional patent application Ser. No. 16/862, 445, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 16/197, 826, now U.S. Pat. No. 10,831,507 B2, filed Nov. 21, 2018, entitled "CONFIGURATION LOAD OF A RECONFIGURABLE DATA PROCESSOR;"

U.S. Nonprovisional patent application Ser. No. 16/198, 086, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 17/093, 543, filed Nov. 9, 2020, entitled "EFFICIENT CONFIGURATION OF A RECONFIGURABLE DATA PROCESSOR;"

U.S. Nonprovisional patent application Ser. No. 16/260, 548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"

U.S. Nonprovisional patent application Ser. No. 16/536, 192, now U.S. Pat. No. 11,080,227 B2, filed Aug. 8, 2019, entitled "COMPILER FLOW LOGIC FOR RECONFIGURABLE ARCHITECTURES;"

U.S. Nonprovisional patent application Ser. No. 17/326, 128, filed May 20, 2021, entitled "COMPILER FLOW LOGIC FOR RECONFIGURABLE ARCHITECTURES;"

U.S. Nonprovisional patent application Ser. No. 16/407, 675, now U.S. Pat. No. 11,386,038 B2, filed May 9, 2019, entitled "CONTROL FLOW BARRIER AND RECONFIGURABLE DATA PROCESSOR;"

U.S. Nonprovisional patent application Ser. No. 16/504, 627, now U.S. Pat. No. 11,055,141 B2, filed Jul. 8, 2019, entitled "QUIESCE RECONFIGURABLE DATA PROCESSOR;"

U.S. Nonprovisional patent application Ser. No. 17/322, 697, filed May 17, 2021, entitled "QUIESCE RECONFIGURABLE DATA PROCESSOR;"

U.S. Nonprovisional patent application Ser. No. 16/572, 516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744, 077, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590, 058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695, 138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688, 069, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718, 094, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 16/560, 057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"

U.S. Nonprovisional patent application Ser. No. 16/572, 527, now U.S. Pat. No. 11,410,027 B2, filed Sep. 16, 2019, entitled "Performance Estimation-Based Resource Allocation for Reconfigurable Architectures;"

U.S. Nonprovisional patent application Ser. No. 15/930, 381, now U.S. Pat. No. 11,250,105 B2, filed May 12, 2020, entitled "COMPUTATIONALLY EFFICIENT GENERAL MATRIX-MATRIX MULTIPLICATION (GEMM);"

U.S. Nonprovisional patent application Ser. No. 17/337, 080, now U.S. Pat. No. 11,328,209 B1, filed Jun. 2, 2021, entitled "MEMORY EFFICIENT DROPOUT;"

U.S. Nonprovisional patent application Ser. No. 17/337, 126, now U.S. Pat. No. 11,256,987 B1, filed Jun. 2, 2021, entitled "MEMORY EFFICIENT DROPOUT, WITH REORDERING OF DROPOUT MASK ELEMENTS;"

U.S. Nonprovisional patent application Ser. No. 16/890, 841, filed Jun. 2, 2020, entitled "ANTI-CONGESTION FLOW CONTROL FOR RECONFIGURABLE PROCESSORS;"

U.S. Nonprovisional patent application Ser. No. 17/023, 015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION;"

U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922,975, filed Jul. 7, 2020, entitled "RUNTIME VIRTUALIZATION OF RECONFIGURABLE DATA FLOW RESOURCES;"

U.S. Nonprovisional patent application Ser. No. 16/996,666, filed Aug. 18, 2020, entitled "RUNTIME PATCHING OF CONFIGURATION FILES;"

U.S. Nonprovisional patent application Ser. No. 17/214,768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127,818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127,929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185,264, filed Feb. 25, 2021, entitled "TIME-MULTIPLEXED USE OF RECONFIGURABLE HARDWARE;"

U.S. Nonprovisional patent application Ser. No. 17/216,647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216,650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216,657, now U.S. Pat. No. 11,263,170 B1, filed Mar. 29, 2021, entitled "LOSSLESS TILING IN CONVOLUTION NETWORKS—PADDING BEFORE TILING, LOCATION-BASED TILING, AND ZEROING-OUT;"

U.S. Nonprovisional patent application Ser. No. 17/384,515, filed Jul. 23, 2021, entitled "LOSSLESS TILING IN CONVOLUTION NETWORKS—MATERIALIZATION OF TENSORS;"

U.S. Nonprovisional patent application Ser. No. 17/216,651, now U.S. Pat. No. 11,195,080 B1, filed Mar. 29, 2021, entitled "LOSSLESS TILING IN CONVOLUTION NETWORKS—TILING CONFIGURATION;"

U.S. Nonprovisional patent application Ser. No. 17/216,652, now U.S. Pat. No. 11,227,207 B1, filed Mar. 29, 2021, entitled "LOSSLESS TILING IN CONVOLUTION NETWORKS—SECTION BOUNDARIES;"

U.S. Nonprovisional patent application Ser. No. 17/216,654, now U.S. Pat. No. 11,250,061 B1, filed Mar. 29, 2021, entitled "LOSSLESS TILING IN CONVOLUTION NETWORKS—READ-MODIFY-WRITE IN BACKWARD PASS;"

U.S. Nonprovisional patent application Ser. No. 17/216,655, now U.S. Pat. No. 11,232,360 B1, filed Mar. 29, 2021, entitled "LOSSLESS TILING IN CONVOLUTION NETWORKS—WEIGHT GRADIENT CALCULATION;"

U.S. Nonprovisional patent application Ser. No. 17/364,110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364,129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364,141, filed Jun. 30, 2021, entitled ""LOSSLESS TILING IN CONVOLUTION NETWORKS—PADDING AND RE-TILLING AT SECTION BOUNDARIES;"

U.S. Nonprovisional patent application Ser. No. 17/384,507, filed Jul. 23, 2021, entitled "LOSSLESS TILING IN CONVOLUTION NETWORKS—BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397,241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216,509, now U.S. Pat. No. 11,191,182 B1, filed Mar. 29, 2021, entitled "UNIVERSAL RAIL KIT;"

U.S. Nonprovisional patent application Ser. No. 17/379,921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379,924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378,342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378,391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338, 620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338, 625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338, 626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338, 629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405, 913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a sorting tool, and more particularly, to a sorting tool for determining an ordered sequence of nodes in an operation unit graph for placing and routing the operation unit graph onto a reconfigurable processor. Furthermore, the present technology relates to a method of operating a cost estimation tool for determining an ordered sequence of nodes in an operation unit graph for placing and routing the operation unit graph onto a reconfigurable processor, and to a non-transitory computer-readable storage medium including instructions that, when executed by a processing unit, cause the processing unit to operate a sorting tool for determining an ordered sequence of nodes in an operation unit graph for placing and routing the operation unit graph onto a reconfigurable processor.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With the rapid expansion of applications that can be characterized by dataflow processing, such as natural-language processing and recommendation engines, the performance and efficiency challenges of traditional, instruction set architectures have become apparent. First, the sizable, generation-to-generation performance gains for multicore processors have tapered off. As a result, developers can no longer depend on traditional performance improvements to power more complex and sophisticated applications. This holds true for both CPU fat-core and GPU thin-core architectures.

A new approach is required to extract more useful work from current semiconductor technologies. Amplifying the gap between required and available computing is the explosion in the use of deep learning. According to a study by OpenAI, during the period between 2012 and 2020, the compute power used for notable artificial intelligence achievements has doubled every 3.4 months.

While the performance challenges are acute for machine learning, other workloads such as analytics, scientific applications and even SQL data processing all could benefit from dataflow processing. New approaches should be flexible enough to support broader workloads and facilitate the convergence of machine learning and high-performance computing or machine learning and business applications.

It is common for GPUs to be used for training and CPUs to be used for inference in machine learning systems based on their different characteristics. Many real-life systems demonstrate continual and sometimes unpredictable change, which means predictive accuracy of models declines without frequent updates.

Alternatively, reconfigurable processors, including FPGAs, can be configured to implement a variety of functions more efficiently or faster than might be achieved using a general-purpose processor executing a computer program.

Recently, so-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, are usually implemented as dataflow architectures and often include specialized hardware elements such as computing resources and device memory that operate in conjunction with one or more software elements such as a CPU and attached host memory in implementing user applications.

Implementing user applications on reconfigurable processors usually involves placement of the user application onto the reconfigurable processor using a placement tool, which is sometimes also referred to as a placer, and routing of the placed user application using a routing tool, which is sometimes also referred to as a router.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 9A is a diagram of an illustrative operation unit graph with a first node in an ordered sequence of nodes.

FIG. 9B is a diagram of the illustrative operation unit graph of FIG. 9A with a second node added to the ordered sequence of nodes.

FIG. 9G is a diagram of the illustrative operation unit graph of FIG. 9F with a seventh node added to the ordered sequence of nodes.

FIG. 9H is a diagram of the illustrative operation unit graph of FIG. 9G with an eighth node added to the ordered sequence of nodes.

FIG. 9I is a diagram of the illustrative operation unit graph of FIG. 9H with a ninth node added to the ordered sequence of nodes.

FIG. 9J is a diagram of the illustrative operation unit graph of FIG. 9I with a tenth node added to the ordered sequence of nodes.

DETAILED DESCRIPTION

Figure 1:
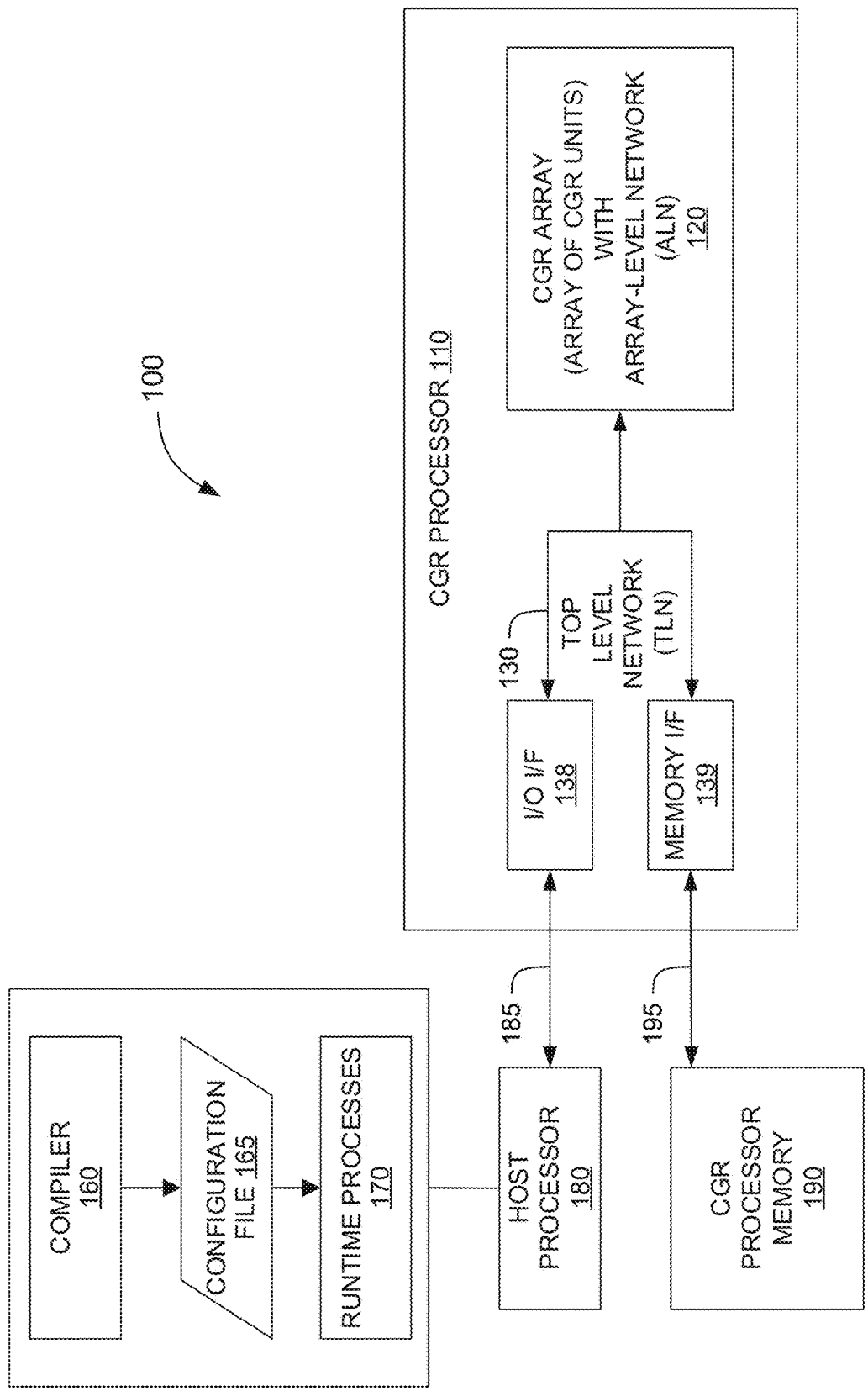
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

Applications for machine learning (ML) and artificial intelligence (AI) may require massively parallel computations, where many parallel and interdependent threads (metapipelines) exchange data. Therefore, such applications are ill-suited for execution on Von Neumann computers. They require architectures that are adapted for parallel processing, such as coarse-grained reconfigurable (CGR) architectures (CGRAs) or graphic processing units (GPUs).

The ascent of ML, AI, and massively parallel architectures places new requirements on compilers. Reconfigurable processors, and especially CGRAs, often include specialized hardware elements such as compute units and memory units that operate in conjunction with one or more software elements such as a host processor and attached host memory, and are particularly efficient for implementing and executing highly-parallel applications such as machine learning applications.

Thus, such compilers are required to pipeline computation graphs, or dataflow graphs, decide which operations of an operation unit graph are assigned to which portions of the reconfigurable processor, how data is routed between various compute units and memory units, and how synchronization is controlled, particularly when a dataflow graph includes one or more nested loops, whose execution time varies dependent on the data being processed.

In this context, it is particularly important for the compiler to perform hardware resource allocation during placement and routing such that the performance of a dataflow graph implementation on a given reconfigurable processor is optimized while the implementation optimizes the utilization rate of the reconfigurable processor's hardware resources.

A placement tool typically receives an operation unit graph having nodes that correspond to circuitry on the reconfigurable processor and edges that interconnect the nodes, together with a description of the reconfigurable processor architecture. The placement tool outputs a placed operation unit graph in which each node is assigned to a location on the reconfigurable processor such that one or more objectives is optimized.

Such objectives may include, for example, minimizing wire congestion to ensure that a placed operation unit graph can be routed, optimizing timing such that the implemented application can be executed at a predetermined clock speed, minimizing latency, maximizing throughput, or a combination thereof. Sometimes, measurable approximations of these objectives are used instead to simplify the quantification of these objectives. For example, the estimated maximum wire length between two placed nodes may be used to approximate timing. Conventionally, two or more objectives are combined in form of a cost function. Such a cost function is often expressed in form of a weighted sum of different objectives. The coefficients of the weighted sum may be selected to achieve a predetermined trade-off between the objectives.

Some placement tools start with an initial placement in which every node is assigned to an initial location and an initial cost for the initial placement is calculated. In subsequent passes, the placement tools determine a current placement by assigning nodes to alternative locations and calculate a cost associated with the current placement, which may be selected as the best current placement or not based on the cost. The determination of the current placement and the selection as the best current placement usually depend on the placement tool.

For example, a placement tool that operates on the basis of a simulated annealing (SA) algorithm may start with an initial placement and perform node swaps during an optimization phase. During the optimization phase, the placement tool may randomly select two nodes and swap their location assignments to determine a current placement. The current placement is always adopted if the cost of the current placement is lower than the cost of the best placement encountered so far. However, the current placement is also adopted with a certain probability as the best placement even if the cost of the current placement is higher than the cost of the best placement encountered so far, whereby the probability of accepting node swaps that lead to a current placement with a higher cost than the best placement decreases with the number of node swaps. The acceptance of node swaps that lead to a current placement with a higher cost than the best placement encountered so far is necessary to avoid placement solutions that are associated with a local optimum of the cost function.

After the placement tool has finished placing the operation unit graph, the routing tool begins to connect the placed nodes on the reconfigurable processor according to the connections in the operation unit graph and the available reconfigurable interconnect fabric of the reconfigurable processor. Therefore, the routing tool typically receives the placed operation unit graph together with the description of the reconfigurable processor architecture.

Some routing tools start with an initial routing in which every edge of the operation unit graph uses the shortest path between the source and the sink node, regardless of any congestion or routing blockages. Thereby, edges of the operation unit graph are assigned to a set of interconnect resources on the shortest path between the source and the sink node to form a connection between the source and the sink node on the reconfigurable processor.

In subsequent passes, the routing tool removes and re-routes the connections that use an oversubscribed interconnect resource starting with the connection having the lowest cost path. The cost of using an interconnect resource is dependent on the current overuse of the interconnect resource and any overuse from a prior pass. Thereby, the cost of using an oversubscribed interconnect resource is gradually increased such that connections with the lowest cost path are encouraged to use alternative interconnect resources. Thus, only the connections with the highest cost continue to use the previously oversubscribed interconnect resource.

As mentioned above, CGRAs are an extremely attractive platform when performance, power, or energy efficiency are paramount. A CGRA is usually a composition of coarse-grained reconfigurable compute and memory elements that are interconnected together in a certain topology using a reconfigurable interconnect fabric. It is referred to as coarse-grained reconfigurable because the reconfigurable components in the architecture operate at a coarser granularity such as instructions, words, and vectors of words, as opposed to fine-grained, bit-level granularity commonly found in architectures such as FPGAs. The programmable data and control paths in CGRAs make them a natural fit to exploit nested parallelism in applications, by connecting the reconfigurable compute and memory components into customized, deeply nested, and hierarchical pipelines.

Since reconfigurable processors such as CGRAs have a different architecture than fine-grained reconfigurable devices, it is desirable to provide a new placement and routing approach for implementing user applications on coarse-grained reconfigurable processors. Such a new placement and routing approach may combine the sorting of the nodes in the operation unit graph in preparation for the assignment of nodes from the operation unit graph to circuitry in the reconfigurable processors and the assignment of edges in the operation unit graph to interconnect resources in the reconfigurable processor.

The new approach should quickly and reliably achieve a functioning implementation of the user applications on the coarse-grained reconfigurable processor and provide for a flexible and efficient use of the reconfigurable data-flow resources for the execution of the user applications.

FIG. 1 illustrates an example data processing system 100 including a host processor 180, a reconfigurable processor such as a coarse-grained reconfigurable (CGR) processor 110, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195. Array of CGR units 120 may further include compute units and memory units that are interconnected with an array-level network (ALN) to provide the circuitry for execution of a computation graph or a data flow graph that may have been derived from a high-level program with user algorithms and functions. A high-level program is source code written in programming languages like Spatial, Python, C++, and C. The high-level program and referenced libraries can implement computing structures and algorithms of machine learning models like AlexNet, VGG Net, Google-Net, ResNet, ResNeXt, RCNN, YOLO, SqueezeNet, Seg-Net, GAN, BERT, ELMo, USE, Transformer, and Transformer-XL.

If desired, the high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

The architecture, configurability, and data flow capabilities of CGR array 120 enables increased compute power that supports both parallel and pipelined computation. CGR processor 110, which includes CGR arrays 120, can be programmed to simultaneously execute multiple independent and interdependent data flow graphs. To enable simultaneous execution, the data flow graphs may be distilled from a high-level program and translated to a configuration file for the CGR processor 110. In some implementations, execution of the data flow graphs may involve using more than one CGR processor 110.

Host processor 180 may be, or include, a computer such as further described with reference to FIG. 2. Host processor 180 runs runtime processes 170, as further referenced herein. In some implementations, host processor 180 may also be used to run computer programs, such as the compiler 160 further described herein with reference to FIG. 6. In some implementations, the compiler may run on a computer that is similar to the computer described with reference to FIG. 2, but separate from host processor 180.

The compiler may perform the translation of high-level programs to executable bit files. While traditional compilers sequentially map operations to processor instructions, typically without regard to pipeline utilization and duration (a task usually handled by the hardware), an array of CGR units 120 requires mapping operations to processor instructions in both space (for parallelism) and time (for synchronization of interdependent computation graphs or data flow graphs). This requirement implies that a compiler for the CGR array 120 decides which operation of a computation graph or data flow graph is assigned to which of the CGR units in the CGR array 120, and how both data and, related to the support of data flow graphs, control information flows among CGR units in the CGR array 120, and to and from host processor 180 and attached CGR processor memory 190.

The compiler may include a cost estimation tool for determining scaled logical edge bandwidths of the edges in the computation graph or data flow graph as well as a sorting tool for determining an ordered sequence of nodes in the computation graph or data flow graph for placing and routing the computation graph or data flow graph on CGR processor 110. An illustrative sorting tool is further described herein with reference to FIG. 8.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file 165. Runtime processes 170 may install the configuration file 165 in CGR processor 110. In some implementations described herein, a CGR array 120 is configured by programming one or more configuration stores with all or parts of the configuration file 165. Therefore, the configuration file is sometimes also referred to as a programming file.

A single configuration store may be at the level of the CGR processor 110 or the CGR array 120, or a CGR unit may include an individual configuration store. The configuration file 165 may include configuration data for the CGR array and CGR units in the CGR array, and link the computation graph to the CGR array. Execution of the configuration file by CGR processor 110 causes the CGR array (s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
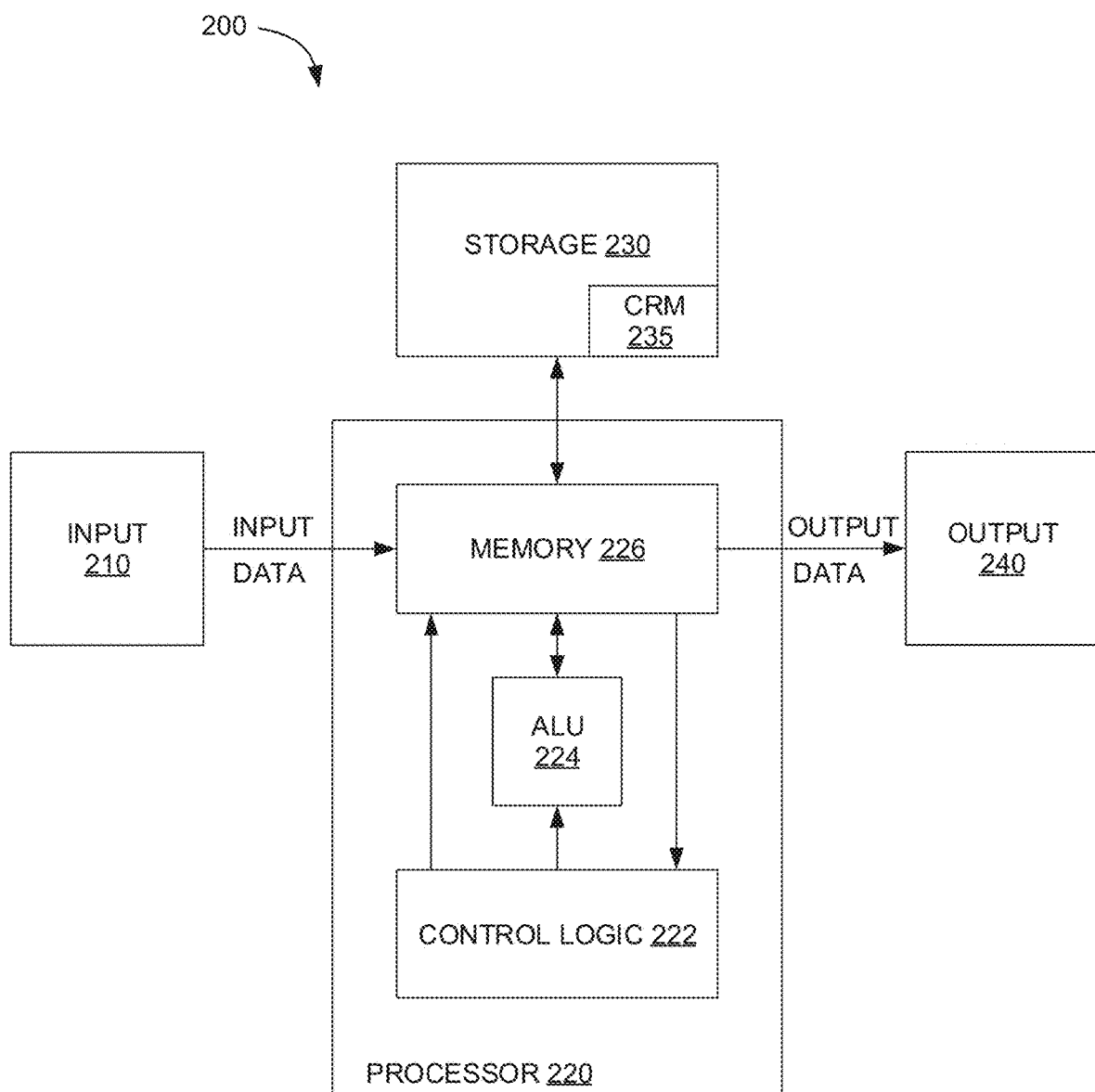
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220, to provide input data. If desired, memory 226 of processor 220 may store the input data. Processor 220 is coupled with output device 240. In some implementations, memory 226 may provide output data to output device 240.

Processor 220 further includes control logic 222 and arithmetic logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM) 235, such as used for storing computer programs. The storage device 230 is sometimes also referred to as host memory.

Figure 3:
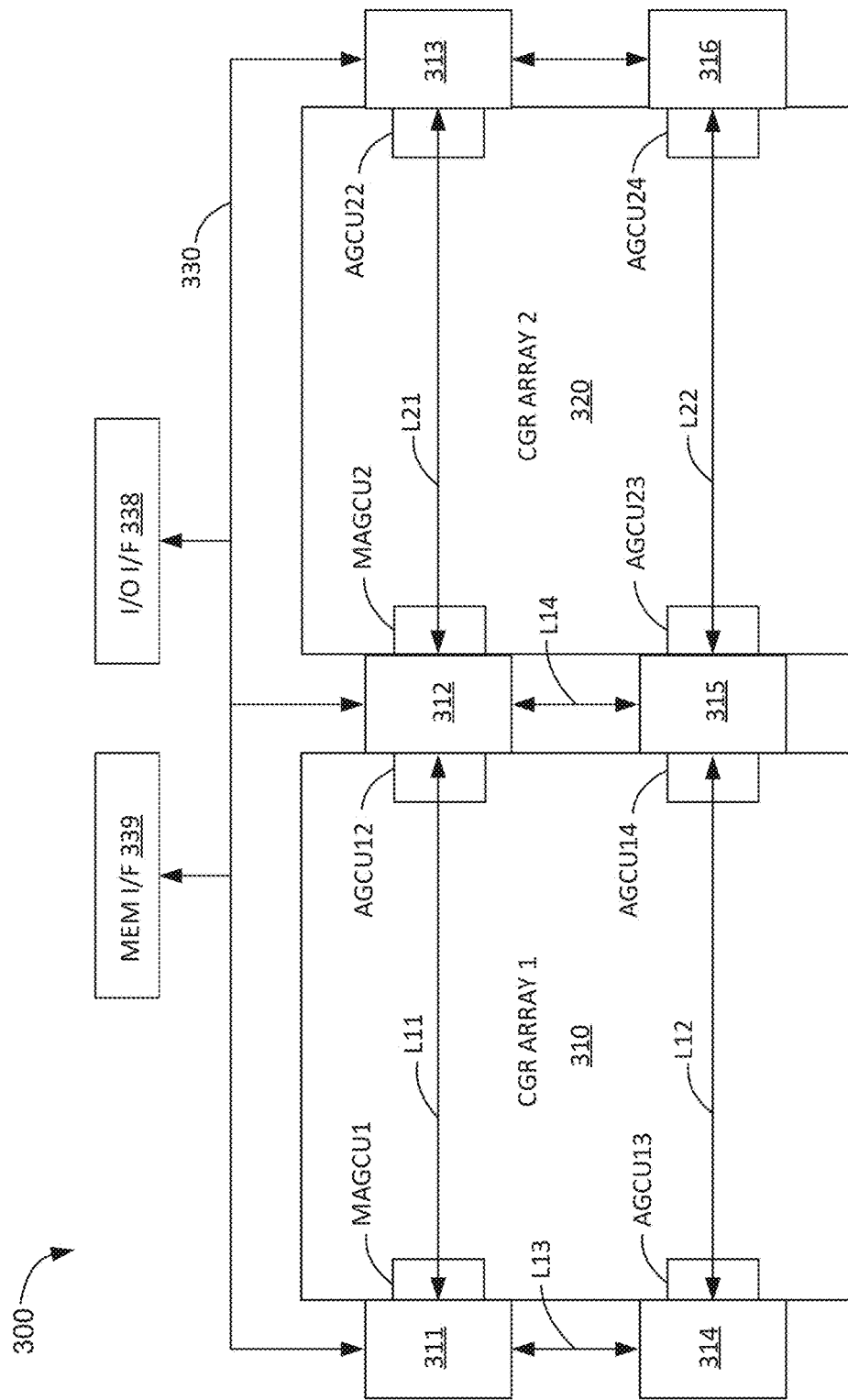
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
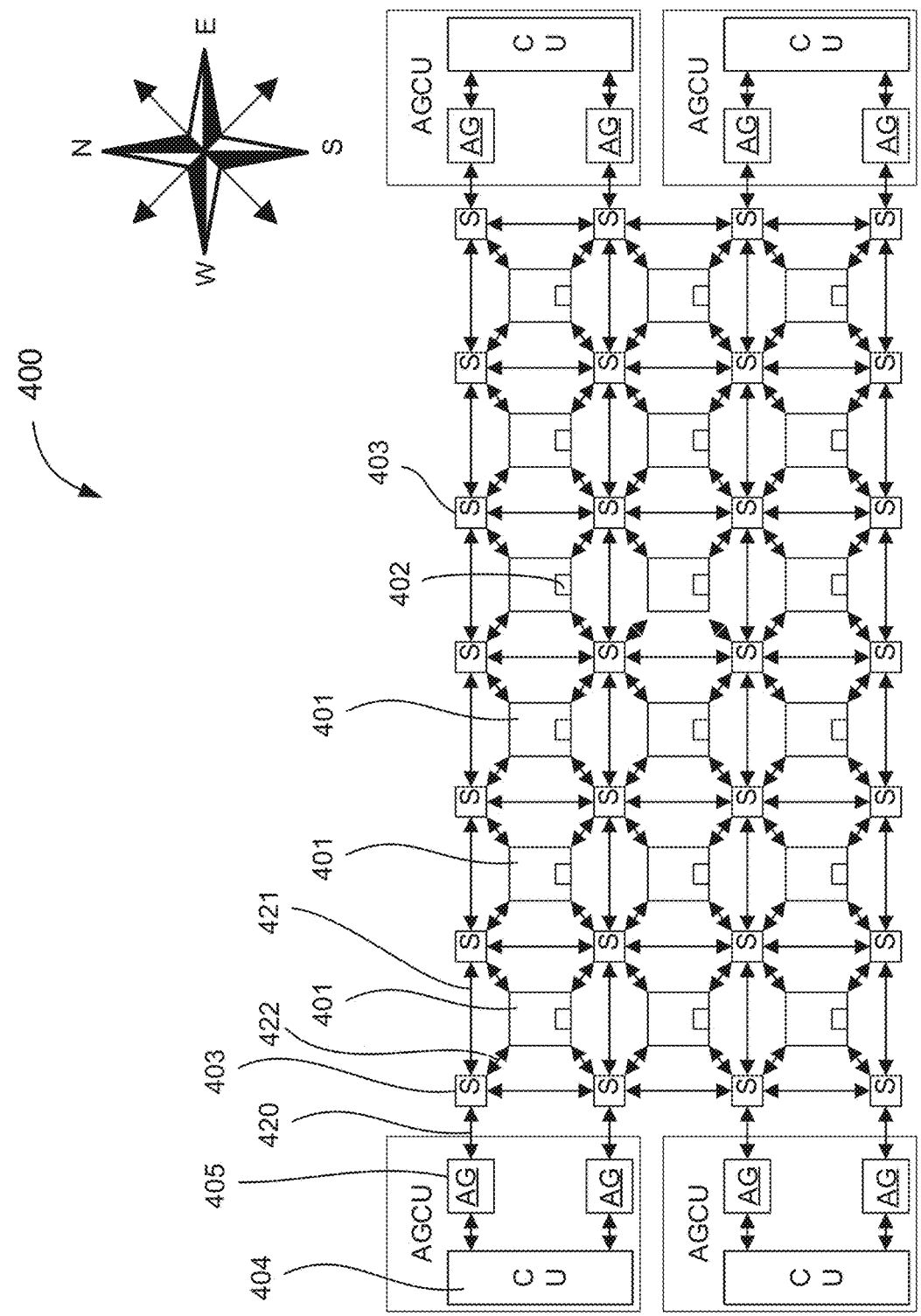
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada.

Illustratively, each CGR unit of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes 170, which is sometimes also referred to as "runtime logic") may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., Northeast, Northwest, Southeast, Southwest, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance using one of the interconnects 422. Two switch units 403 in each CGR array quadrant have links to an AGCU using interconnects 420. The coalescing unit 404 of the AGCU arbitrates between the address generators 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more interconnects 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
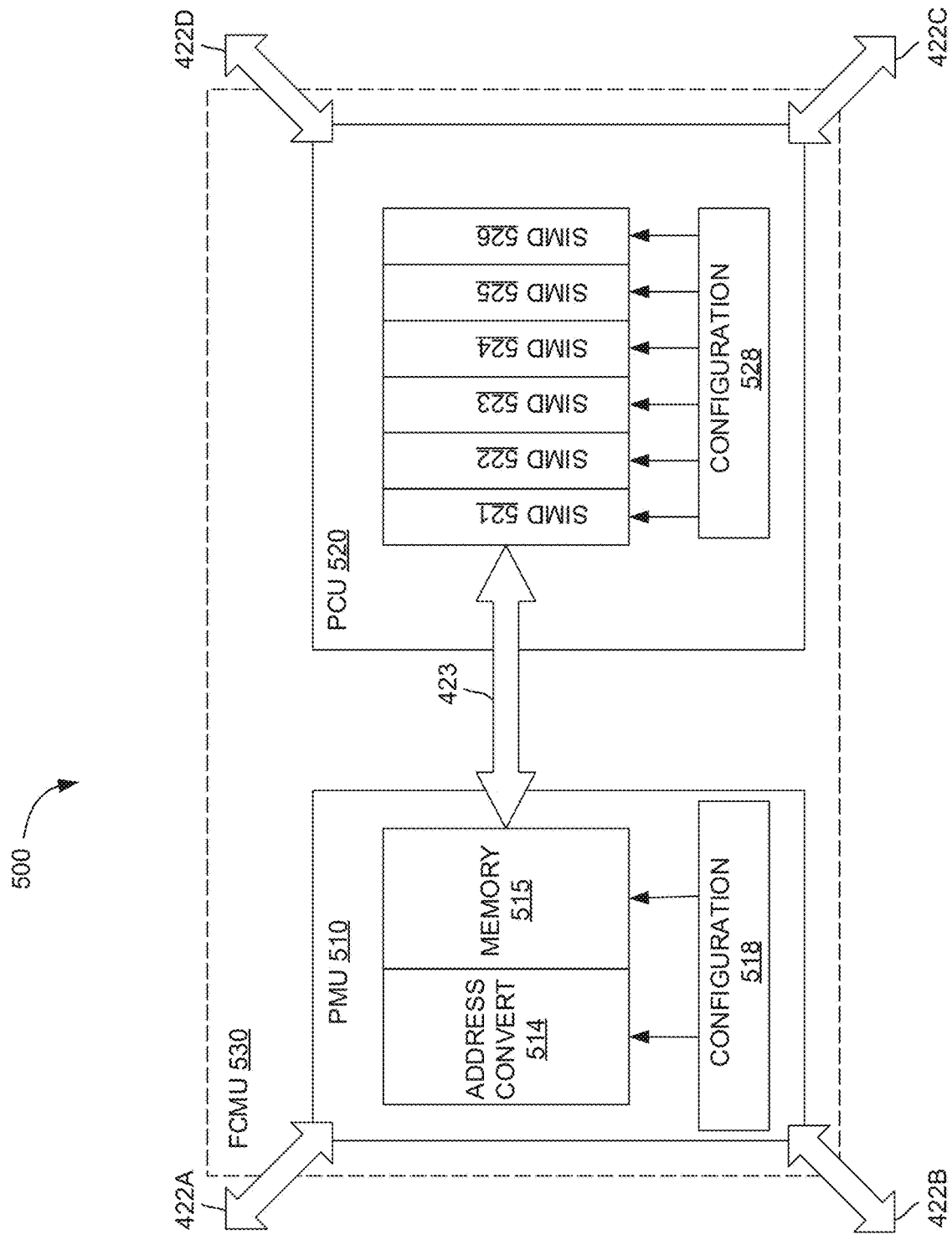
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. The FCMU 530 may include multiple ALN links, such as ALN link 423 that connects PMU 510 with PCU 520, northwest ALN link 422A and southwest ALN link 422B, which may connect to PMU 510, and southeast ALN link 422C and northeast ALN link 422D, which may connect to PCU 520. The northwest ALN link 422A, southwest ALN link 422B, southeast ALN link 422C, and northeast ALN link 422D may connect to switches 403 as shown in FIG. 4. Each ALN link 422A-D, 423 may include one or more scalar links, one or more vector links, and one or more control links where an individual link may be unidirectional into FCMU 530, unidirectional out of FCMU 530 or bidirectional. FCMU 530 can include FIFOs to buffer data entering and/or leaving the FCMU 530 on the links.

PMU 510 may include an address converter 514, a scratchpad memory 515, and a configuration store 518. Configuration store 518 may be loaded, for example, from a program running on host processor 180 as shown in FIG. 1, and can configure address converter 514 to generate or convert address information for scratchpad memory 515 based on data received through one or more of the ALN links 422A-B, and/or 423. Data received through ALN links 422A-B, and/or 423 may be written into scratchpad memory 515 at addresses provided by address converter 514. Data read from scratchpad memory 515 at addresses provided by address converter 514 may be sent out on one or more of the ALN links 422A-B, and/or 423.

PCU 520 includes two or more processor stages, such as single-instruction multiple-data (SIMD) 521 through SIMD 526, and configuration store 528. The processor stages may include SIMDs, as drawn, or any other reconfigurable stages that can process data. PCU 520 may receive data through ALN links 422C-D, and/or 423, and process the data in the two or more processor stages or store the data in configuration store 528. PCU 520 may produce data in the two or more processor stages, and transmit the produced data through one or more of the ALN links 422C-D, and/or 423. If the two or more processor stages include SIMDs, then the SIMDs may have a number of lanes of processing equal to the number of lanes of data provided by a vector interconnect of ALN links 422C-D, and/or 423.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
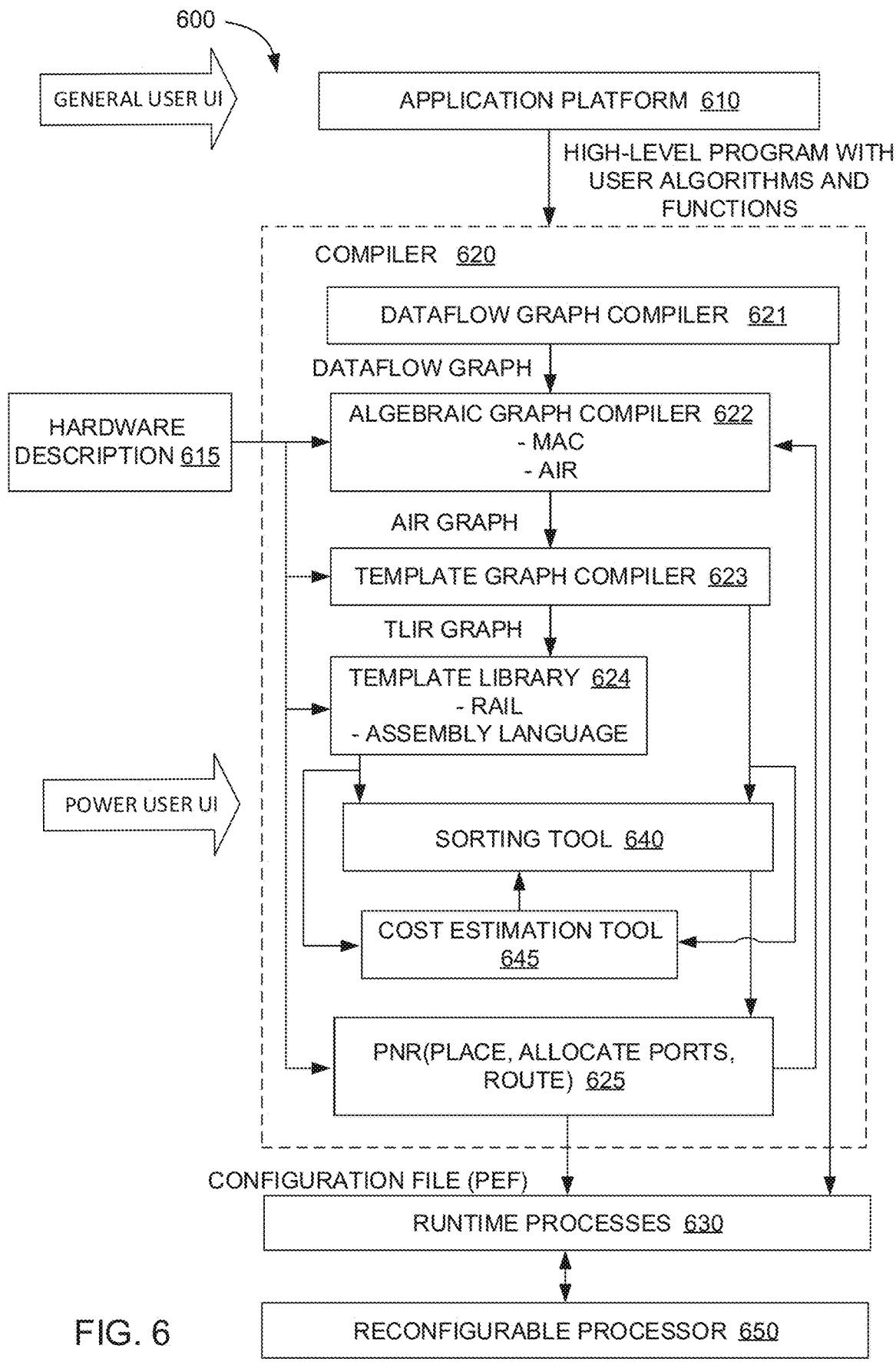
FIG. 6 is a diagram of an illustrative compiler stack implementation suitable for generating a configuration file for a reconfigurable processor.

FIG. 6 is a block diagram of a compiler stack 600 implementation suitable for generating a configuration file for a reconfigurable processor 650 having CGR units such as CGR processor 110 of FIG. 1. As depicted, compiler stack 600 includes several stages to convert a high-level program with statements that define user algorithms and functions, e.g., algebraic expressions and functions, to configuration data for the CGR units. A high-level program may include source code written in programming languages like C, C++, Java, JavaScript, Python, and/or Spatial, for example. In some implementations, the high-level program may include statements that invoke various PyTorch functions.

Compiler stack 600 may take its input from application platform 610, or any other source of high-level program statements suitable for parallel processing, which provides a user interface for general users. If desired, the compiler stack 600 may further receive hardware description 615, for example defining the physical units in a reconfigurable data processor or CGR processor. Application platform 610 may include libraries such as PyTorch, TensorFlow, ONNX, Caffe, and Keras to provide user-selected and configured algorithms.

Application platform 610 outputs a high-level program to compiler 620, which in turn outputs a configuration file that is executed in runtime processes 630 using reconfigurable processor 650.

Compiler 620 may include dataflow graph compiler 621, which may handle a dataflow graph, algebraic graph compiler 622, template graph compiler 623, template library 624, placer and router PNR 625, and cost estimation tool 645. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610. As shown in FIG. 6, dataflow graph compiler 621 outputs a dataflow graph that is received by algebraic graph compiler 622.

Algebraic graph compiler 622 may include a model analyzer and compiler (MAC) level that makes high-level mapping decisions for (subgraphs of the) dataflow graph based on hardware constraints. In some implementations, the algebraic graph compiler 622 may support various application frontends such as Samba, JAX, and TensorFlow/HLO. If desired, the algebraic graph compiler 622 may transform the graphs via autodiff and GradNorm, perform stitching between subgraphs, interface with template generators for performance and latency estimation, convert dataflow graph operations to arithmetic or algebraic intermediate representation (AIR) operations, perform tiling, sharding (database partitioning) and other operations, and model or estimate the parallelism that can be achieved on the dataflow graph.

Algebraic graph compiler 622 may further include an arithmetic or algebraic intermediate representation (AIR) level that translates high-level graph and mapping decisions provided by the MAC level into explicit AIR/Tensor statements and one or more corresponding algebraic graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Thus, algebraic graph compiler 622 replaces the user program statements of a dataflow graph by AIR/Tensor statements of an AIR/Tensor computation graph (AIR graph). As shown in FIG. 6, algebraic graph compiler 622 provides the AIR graph to template graph compiler 623.

Template graph compiler 623 may translate AIR/Tensor statements of an AIR graph into template library intermediate representation (TLIR) statements of a TLIR graph, optimizing for the target hardware architecture into unplaced variable-sized units (referred to as logical CGR units) suitable for PNR 625. Such a TLIR graph is sometimes also referred to as an "operation unit graph" and the unplaced-variable-sized units as "logical units" or "nodes". So-called "Logical edges" or simply "edges" in the operation unit graph may couple the logical units.

Template graph compiler 623 may allocate metapipelines for sections of the template dataflow statements and corresponding sections of unstitched template computation graph. Template graph compiler 623 may add further information (e.g., name, inputs, input names and dataflow description) for PNR 625 and make the graph physically realizable through each performed step. For example, template graph compiler 623 may provide translation of AIR graphs to specific model operation templates such as for general matrix multiplication (GeMM). An implementation may convert part or all intermediate representation operations to templates, which are sometimes also referred to as "template nodes", stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units, which are commonly referred to as logical units, with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

In some implementations, the assembler may generate assembler code for a logical unit, whereby the assembler code is associated with a data operation that is to be executed by the logical unit. The logical units of an operation unit graph may include (e.g., store) the assembler code that is associated with the respective data operations of the respective logical units, if desired.

The template graph compiler 623 may also determine control signals, as well as control gates that are required to enable the CGR units (whether logical or physical) to coordinate dataflow between the CGR units in the CGR array of a CGR processor.

As shown in FIG. 6, compiler 620 may include a cost estimation tool 645 and a sorting tool 640. The cost estimation tool 645 is adapted for determining relative bandwidth requirements of the edges in an operation unit graph. The sorting tool 640 may use the relative bandwidth requirements to provide an ordered sequence of the nodes in the operation unit graph to PNR for implementing the operation unit graph on reconfigurable processor 650.

In some implementations, the sorting tool 640 may be an integral part of PNR 625. In other implementations, the sorting tool 640 may be separate from PNR 625, for example as shown in FIG. 6.

Illustratively, cost estimation tool 645 may receive the operation unit graph from the template graph compiler 623 directly and/or through the template library 624. The operation unit graph includes nodes and edges that couple the nodes. Each one of the nodes is associated with a data operation.

Illustratively, sorting tool 640 may determine an order of the nodes in an operation unit graph for PNR 625. Execution of the sorting tool 640 may be followed by iterative passes of PNR 625 based on the node order with nodes that are earlier in the node order may be placed and routed before nodes that are later in the node order. In other words, the sorting tool 640 may determine a priority for the placement and routing of the nodes.

PNR 625 translates and maps logical (i.e., unplaced physically realizable) units (e.g., the nodes of the operation unit graph) and edges (e.g., the edges of the operation unit graph) to a physical layout of reconfigurable processor 650, e.g., a physical array of CGR units in a semiconductor chip. PNR 625 also determines physical data channels, which are sometimes also referred to as "physical links", to enable communication among the CGR units and between the CGR units and circuits coupled via the TLN or the ALN; allocates ports on the CGR units and switches; provides configuration data and initialization data for the target hardware; and produces configuration files, e.g., processor-executable format (PEF) files.

If desired, PNR 625 may provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. If desired, sorting tool 640 may be included in PNR 625.

Illustratively, PNR 625 may receive its input data in various ways. For example, it may receive parts of its input data from any of the earlier modules (e.g., dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly. As shown in FIG. 6, PNR 625 may receive an ordered sequence of the nodes in the operation unit graph from sorting tool 640.

Further implementations of compiler 620 provide for an iterative process, for example by feeding information from PNR 625 back to an earlier module (e.g., to algebraic graph compiler 622). For example, in some implementations, the earlier module may execute a new compilation step in which it uses physically realized results rather than estimates of cost estimation tool 645 or placeholders for physically realizable circuits. As shown in FIG. 6, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

Figure 7:
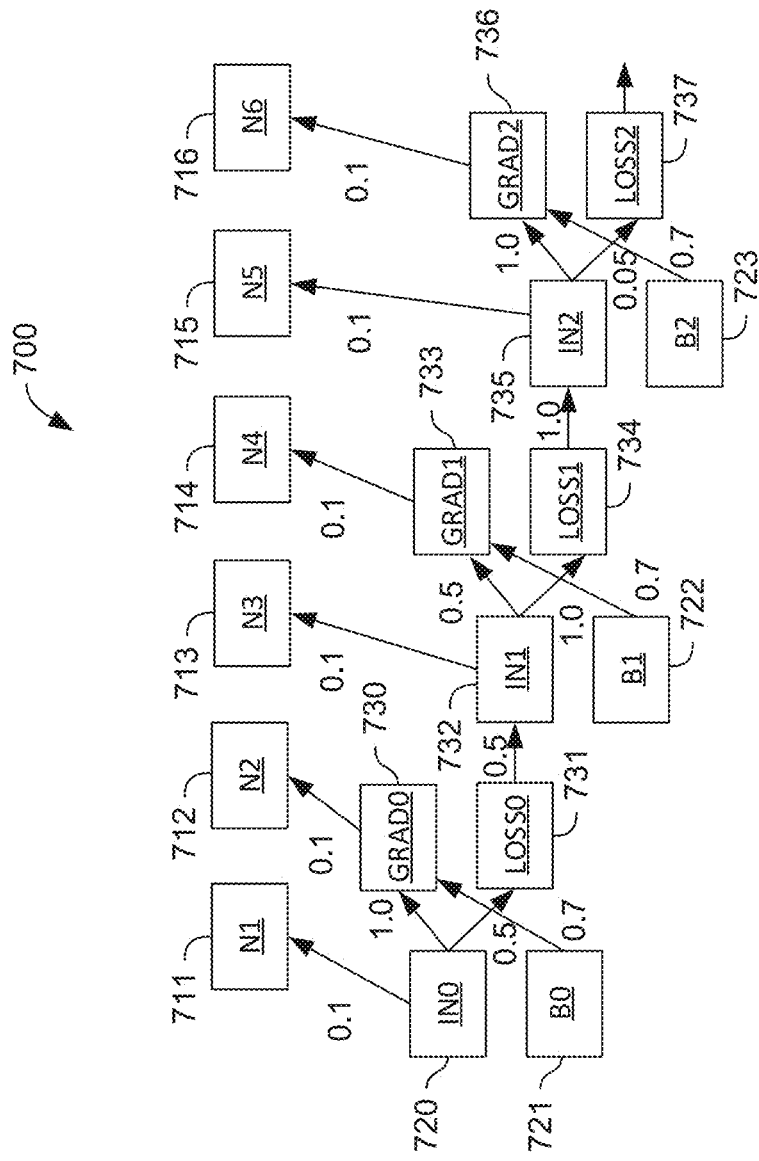
FIG. 7 is a diagram of an illustrative operation unit graph.

FIG. 7 is a diagram of an illustrative operation unit graph 700. The operation unit graph 700 shown in FIG. 7 includes nodes 711 to 716, 720 to 723, and 730 to 737.

The nodes are associated with data operations. The data operations may include configuration load, configuration unload, arithmetic operations, storage operations, just to name a few. If desired, each node may include assembler code that is associated with the data operation. For example, a first node of the nodes in the operation unit graph may include assembler code that is associated with the data operation of the first node.

Illustratively, the operation unit graph 700 may include different types of nodes. For example, a first node of the nodes may include a compute unit (e.g., PCU 520 of FIG. 5) or a memory unit (e.g., PMU 510 of FIG. 5). As shown in FIG. 7, the operation unit graph 700 may include output nodes 711 to 716 (i.e., nodes without fanout and only incoming edges), input nodes 720 to 723 (i.e., nodes without fan-in and only outgoing edges), and intermediate nodes 730 to 737, whereby nodes 730, 733, and 736 may illustratively be associated with a compute unit on a reconfigurable processor such as PCU 520 of FIG. 5.

Note that output nodes 711 to 716 are shown without output ports and input nodes 720 to 723 are shown without input ports. However, input nodes 720 to 723 may have input ports and output nodes 711 to 716 may have output ports. The input ports of input nodes 720 to 723 and the output ports of output nodes 711 to 716 may be coupled outside of the operation unit graph 700 (e.g., via a network).

In some implementations, a node may have a type identifier that corresponds to one of the hardware circuits on the reconfigurable processor. An edge of the operation unit graph may represent a relationship, a direction, and/or a dependency between the nodes that are connected by the edge. If desired, a weight or cost may be associated with an edge. The weight or cost may be associated with the relative bandwidth requirements of the connection between the nodes that are connected by the edge. If desired, the weight of an edge may be greater than zero and smaller than or equal to one (i.e., 0<edge weight <=1, an edge with weight zero is not required and therefore not shown).

Illustratively, a node may have more than one output edge (e.g., node IN0 720 has three output edges). In some scenarios, the node may send the same data to more than one other node. As an example, node IN0 720 of FIG. 7 may send the same data to nodes GRAD0 730 and LOSS0 731. In this example, the two output edges that transmit the second data to nodes GRAD0 730 and LOSS0 731 may be a single net of fanout two. As another example, node IN0 720 may send a first set of data to GRAD0 730 and a second set of data to LOSS0 731, whereby the second set is subset of the first set. In this example, the two output edges that transmit the second data to nodes GRAD0 730 and LOSS0 731 may be a single net of fanout two that transmits the second set of data and a net of fanout one between the nodes IN0 720 and GRAD0 730 that transmits the remainder of the first data from IN0 720 to GRAD0 730.

The operation unit graph 700 of FIG. 7 is a connected operation unit graph in which every node can be reached from at least one input node. In some implementations, the operation unit graph may include two or more connected subgraphs that are not connected with each other.

Figure 8:
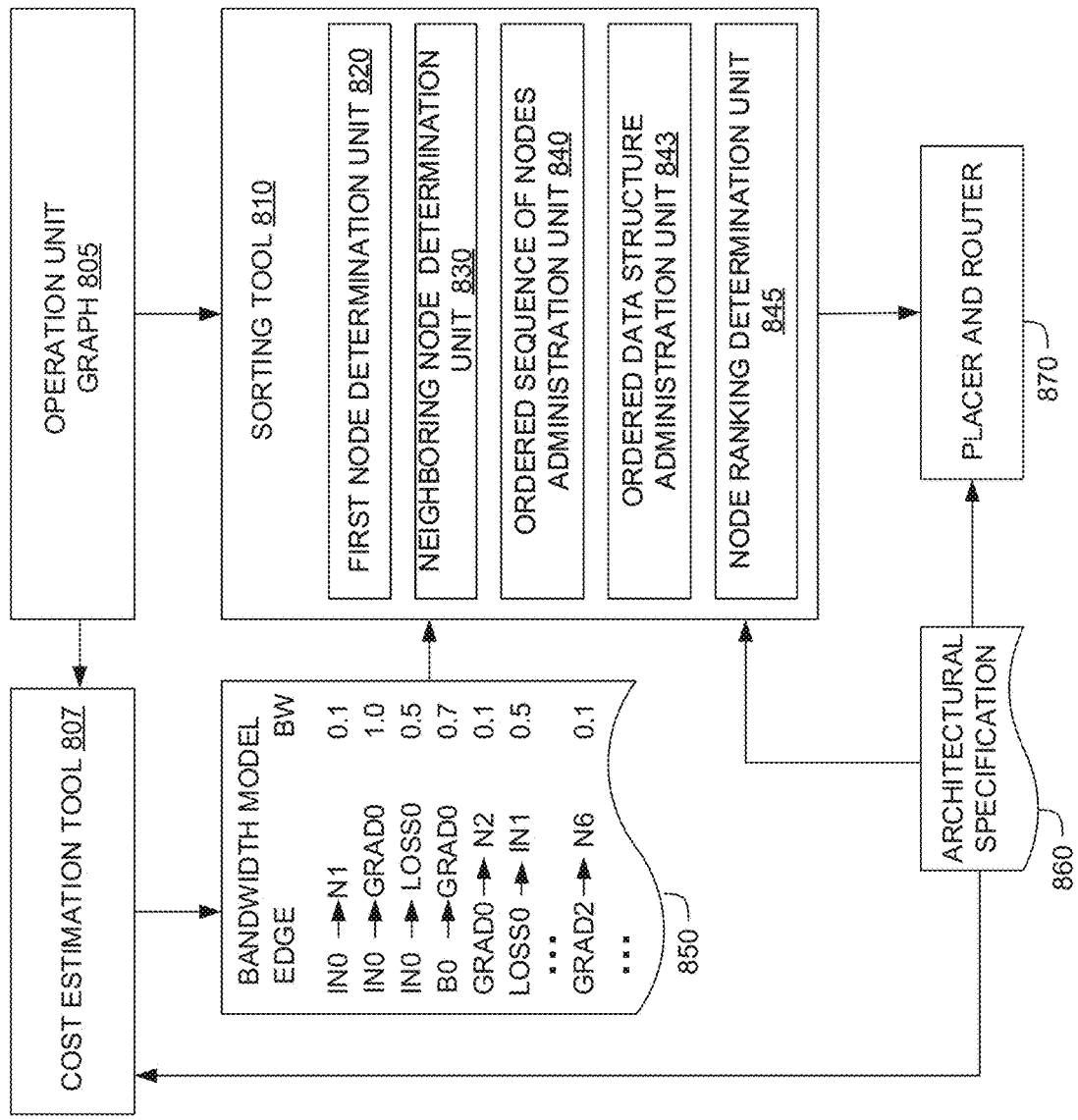
FIG. 8 is a diagram of an illustrative sorting tool that receives an operation unit graph and relative bandwidth requirements of edges and provides an ordered sequence of nodes for placing and routing the operation unit graph onto a reconfigurable processor.

FIG. 8 is a diagram of an illustrative sorting tool 810 that receives an operation unit graph 805 and relative bandwidth requirements 850 of edges and provides an ordered sequence of nodes of the operation unit graph 805 to placer and router 870 for placing and routing the operation unit graph 805 onto a reconfigurable processor (e.g., CGR processor 110 having arrays of CGR units 120 of FIG. 1 or reconfigurable processor 650 of FIG. 6). In some implementations, and as shown in FIG. 8, sorting tool 810 may receive architectural specification 860.

Illustratively, cost estimation tool 807 may receive operation unit graph 805 (e.g., operation unit graph 700 of FIG. 7) and architectural specification 860. Cost estimation tool 807 may determine relative bandwidth requirements 850 of the edges in the operation unit graph 805 and provide the relative bandwidth requirements 850 of the edges of operation unit graph 805 to sorting tool 810.

As shown in FIG. 8, the illustrative sorting tool 810 may include a first node determination unit 820, a neighboring node determination unit 830, an ordered sequence of nodes administration unit 840, an ordered data structure administration unit 843, and a node ranking determination unit 845.

The ordered sequence of nodes administration unit 840 may be configured to maintain an ordered sequence of nodes while the ordered data structure administration unit 843 may be configured to maintain an ordered data structure. In some implementations, the ordered sequence of nodes and/or the ordered data structure may include at least one of a linked list, a queue, a stack, a tree, or a heap. For example, the ordered data structure may be a min priority queue or a min-heap (i.e., a binary tree such that the key contained in each node is less than or equal to the key in this node's children). If desired, the second node and any subsequent node of the sorted nodes may be determined by keeping track of a max priority queue or a max-heap (i.e., a binary tree such that the key contained in each node is greater than or equal to the key in this node's children).

For example, consider the scenario in which the sorting tool 810 is configured to receive an operation unit graph 805 (e.g., operation unit graph 700 of FIG. 7) having a set of unsorted nodes and edges that interconnect nodes in the set of unsorted nodes.

In this scenario, the sorting tool 810 is configured to determine a first position of the ordered sequence of nodes as a current position of the ordered sequence of nodes. The sorting tool 810 is further configured to perform an outer loop that is executed once for every connected subgraph of the operation unit graph 805. Thus, the outer loop is repeated as long as the set of unsorted nodes comprises at least one unsorted node.

In the outer loop, the first node determination unit 820 of the sorting tool 810 is configured to determine, from the set of unsorted nodes, a node-to-be-sorted in the operation unit graph 805 and add the node-to-be-sorted to an ordered data structure. Thus, the sorting tool 810 determines a starting point of the node sort by selecting any unsorted node and/or a particular unsorted node in a connected subgraph.

As an example, the first node may be randomly selected among all the nodes of the unsorted nodes in the operation unit graph. As another example, the sorting tool may first determine a connected subgraph (e.g., by randomly selecting an unsorted node and determining the connected subgraph by performing a search) and a first node within the connected subgraph. For example, the connected subgraph may include a list of all the nodes, and determining the first node may include selecting a node that is at a predetermined position (e.g., the first node, the last node, etc.) in the list. As yet another example, the first node may be determined as being a source node or a sink node of the connected subgraph. Source and sink nodes of the connected subgraph may be determined by inspecting all nodes of the connected subgraph. A node is a source node, which is sometimes also referred to as an input node, if it has no input connection (i.e., no fan-in). A node is a sink node, which is sometimes also referred to as an output node, if it has no output connection (i.e., no fanout). As mentioned above, in the example of FIG. 7, nodes IN0 720, B0 721, B1 722, and B2 723 are source nodes, and nodes N1 711, N2 712, N3 713, N4 714, N5 715, and N6 716 are sink nodes of operation unit graph 700 which is a connected graph.

Illustratively, the connected subgraph may include a longest path between a source and a sink node. As an example, a depth-first search (DFS) or a breadth-first search (BFS) may be used to determine the longest path between a source and a sink node. As another example, Dijkstra's algorithm may be used to determine the longest path between a source and a sink node. DFS, BFS, or Dijkstra's algorithm may start with an arbitrary source node or with an arbitrary sink node.

In the example of FIG. 7, the longest paths from source nodes B0 721, B1 722, and B2 723 are B0→GRAD0→N2, B1→GRAD1→N4, and B2→GRAD2→N6, and each one of these three paths has a length of two. The longest path from source node IN0 720 has a length of at least six and includes IN0→LOSS0→IN1→LOSS1→IN2→LOSS2→etc. (assuming that the graph continues after node LOSS2, if not the longest path would include IN0→LOSS0→IN1→LOSS1→IN2→GRAD2→N6).

By way of example, the first node may be determined as being the source node of the longest path. In the example of FIG. 7, node iIN0 720 may be determined as being the source node on the longest path. If desired, the first node may be determined as being the sink node of the longest path.

In some scenarios, the operation unit graph may include more than one source node and/or more than one sink node on the longest path (e.g., when two or more paths have the same length and a greater length than any other path between source and sink nodes, or when more than one source node is the starting point of the longest path or more than one sink node is an end point of the longest path). In such scenarios, the first node may be selected among the more than one source nodes or among the more than one sink nodes.

If desired, another criterion or other criteria may be selected to break ties between the source nodes or the sink nodes of the longest path to determine the first node among the more than one source nodes or among the more than one sink nodes. As an example, the source node or the sink node with the highest bandwidth connection to the next node on the longest path may be selected as the first node. As another example, the source node with the highest fanout net may be selected as the first node.

The sorting tool 810 is further configured to perform an inner loop that is executed once for every node in a connected subgraph of the operation unit graph 805. The inner loop is repeated until the ordered data structure is empty.

In the inner loop, the sorting tool 810 is configured to remove a next node-to-be-sorted from the ordered data structure in order of the ordered data structure. For example, after the insertion of the first node into the ordered data structure, the first node is the next node-to-be-sorted in the ordered data structure. The ordered sequence of nodes administration unit 840 of sorting tool 810 is further configured to insert the next node-to-be-sorted as the currently inserted node at the current position of the ordered sequence of nodes and assign a subsequent position of the ordered sequence of nodes as the current position of the ordered sequence of nodes.

Illustratively, the neighboring node determination unit 830 of the sorting tool 810 is configured to determine neighboring nodes of the currently inserted node from the set of unsorted nodes, whereby each one of the neighboring nodes is separated from the currently inserted node by one of the edges. In other words, a single edge in the operation unit graph 805 separates two neighboring nodes.

The ordered data structure administration unit 843 of the sorting tool 810 is configured to add each one of the neighboring nodes as a node-to-be-sorted to the ordered data structure. In some implementations, the ordered data structure administration unit 843 of the sorting tool 810 may be configured to determine a ranking of nodes-to-be-ranked. The nodes-to-be-ranked may include the neighboring nodes and each node-to-be-sorted in the ordered data structure.

For determining the ranking of the nodes-to-be-ranked, the sorting tool 810 may be configured to determine a series of keys for each one of the nodes-to-be-ranked. The ranking of the nodes-to-be-ranked may be based on the series of keys, if desired.

For example, the sorting tool 810 may, for determining the series of keys for each one of the nodes-to-be-ranked, be configured to determine a key of the series of keys for a current node of the nodes-to-be-ranked based on a cost function of the current node of the nodes-to-be-ranked.

Illustratively, the sorting tool 810 may be configured to determine the ranking of the nodes-to-be-ranked based on a first key in the series of keys. In some implementations, the sorting tool 810 may determine whether nodes of the nodes-to-be-ranked have the same first key. In response to determining that nodes of the nodes-to-be-ranked have the same first key, the sorting tool 810 may rank the nodes of the nodes-to-be-ranked with the same first key among themselves based on subsequent keys in the series of keys.

After having determined a ranking of the nodes-to-be-ranked, the ordered data structure administration unit 843 of the sorting tool 810 may rearrange each node-to-be-sorted in the ordered data structure according to the ranking and insert each one of the neighboring nodes as a node-to-be-sorted according to the ranking into the ordered data structure.

The sorting tool 810 is further configured to remove the currently inserted node from the set of unsorted nodes.

After the inner and outer loops have finished and no unsorted nodes are remaining, the sorting tool 810 is configured to provide the ordered sequence of nodes for the placing and routing of the operation unit graph onto the reconfigurable processor. For example, the sorting tool 810 may be configured to provide the ordered sequence of nodes to placer and router 870.

As mentioned above, the ordered sequence of nodes and/or the ordered data structure can include a linked list, a queue, a stack, a tree, or a heap. In the interest of conciseness, the sorting tool 810 keeps track of a min heap that is based on a series of keys for the remainder of this description. Features described for the min heap can easily be adapted for a max heap or other data structures, if desired. In some implementations, the ordered sequence of nodes and/or the ordered data structure may have a corresponding field within the data structure of the node that is labeled with the rank in the ordered sequence of nodes and/or the rank in the ordered data structure. In other words, each node may be labeled with its rank in the ordered sequence of nodes and/or with its rank in the ordered data structure.

In some implementations, a lower key may be associated with a higher priority for being sorted. In other implementations, a lower key may be associated with a lower priority for being sorted. If desired, the key of each node may be associated with a predetermined cost function.

Illustratively, the predetermined cost function on which the key is based may be based on a single criterion. If desired, the predetermined cost function on which the key is based may be based on two or more criteria (e.g., bandwidth of a connection, whether fan-in or fanout nodes have already been sorted, etc.). As an example, the predetermined cost function may be calculated as a weighted sum of the two or more criteria. As another example, the predetermined cost function may be based on a first criterion of the two or more criteria and each subsequent criterion may be considered only if two or more nodes have the same key.

If desired, each key may be based on a different criterion. For example, the node may have two keys, whereby the second key is only considered if two or more nodes have the same first key. In some implementations, a node may have more than two keys and each subsequent key may only be considered if more than two nodes have the same preceding keys.

Illustratively, a node (e.g., node A) may have a first key. The first key may include the most important criterion or the most important criteria for the subsequent placement and routing operations. For example, the first key may be zero if node A has two or more input edges and all nodes (e.g., nodes B and C) that are connected via the two or more input edges with node A (e.g., nodes B and C) have already been sorted or if node A has an output edge with a fanout of two or more and all nodes (e.g., nodes D and E) that are connected via the output edge with node A (e.g., nodes D and E) have already been sorted. If desired, the first key may also be zero if an input edge of node A from node B is also an input edge to more than one other node (e.g., nodes F and G, thus the output edge of node B has a fanout of three and connects with nodes A, F, and G) and nodes B, F and G have already been sorted.

Additional criteria may be considered in the first key based on the architecture of the underlying reconfigurable processor, if desired. For example, nodes may be connected to virtual channels (i.e., one of the input and/or output edges is part of a virtual channel) and some virtual channels (e.g., a virtual channel A) may not provide for end-to-end control of the packets that are sent along virtual channel A. In this example, the first key may be decremented by a predetermined value (e.g., 0.5, 1, or any other suitable value) to indicate that such a node that is connected to virtual channel A should be placed and routed earlier than other nodes that are not connected to virtual channel A.

Illustratively, a node (e.g., node A) may have a second key. The second key may be based on the highest bandwidth (i.e., on the weight) of any edge that connects node A with any other already sorted node. In the scenario in which the sorting tool uses a min heap as the ordered data structure, the highest bandwidth requirements may be associated with the lowest key values and the lowest bandwidth requirements may be associated with the highest key values.

For example, if the weights on the edges are greater than 0 (i.e., low bandwidth requirement) and smaller than or equal to one (i.e., high bandwidth requirement), the second key may be calculated as 1—maximum weight on any edge with an already sorted node. In the example of FIG. 7, the second key of node GRAD0 730 would be zero if nodes B0 721 and IN0 720 have been sorted. The second key of node GRAD0 930 would be 0.3 if only node B0 721 has been sorted, but not node IN0 720.

Illustratively, a node (e.g., node A) may have a third key. The third key may be based on the insertion order into the ordered data structure 950. As an example, nodes that have a higher insertion order (i.e., that are later in the ordered data structure 950) may be sorted earlier than nodes with a lower insertion order. For example, add one to the third key of node A for every node that is sorted while node A is in the ordered data structure 950. As another example, nodes that have a lower insertion order (i.e., that are earlier in the ordered data structure 950) may be sorted later than nodes with a higher insertion order. For example, assign node A the number of nodes that have been sorted when node A is put into the ordered data structure 950.

FIG. 9A is a diagram of an illustrative operation unit graph 900. The illustrative operation unit graph 900 of FIG. 9A is a connected graph in which every node including output nodes 911 to 916 and intermediate nodes 930 to 937 can be reached from at least one input node 920 to 923.

In some implementations, an operation unit graph may include two or more connected subgraphs that are not connected with each other. In the interest of conciseness, the sorting tool is described in FIGS. 9A to 9L to operate on an illustrative connected operation unit graph 900. The sorting tool as described with reference to FIGS. 9A to 9L can also sort the nodes in an operation unit graph with two or more connected subgraphs. For example, the sorting tool may handle each node within a subgraph of the two or more connected subgraphs subsequently in an inner loop, while an outer loop iterates through all the subgraphs in the operation unit graph, if desired.

For example, consider the scenario in which a sorting tool (e.g., sorting tool 810 of FIG. 8) receives the operation unit graph 900 of FIG. 9A in which all nodes are unsorted and for which a cost estimation tool (e.g., cost estimation tool 807 of FIG. 8) has determined relative bandwidth requirements of the edges. As shown in FIG. 9A, the relative bandwidth requirements have been annotated to the corresponding edges.

Consider further that the sorting tool has determined a first position of an ordered sequence of nodes as a current position of the ordered sequence of nodes, and that the sorting tool has determined, from the set of unsorted nodes, node IN0 920 as a node-to-be-sorted and added the node-to-be-sorted to an ordered data structure 950.

As an example, the sorting tool may have determined a set of input nodes and a set of output nodes in the set of unsorted nodes. For example, the set of input nodes may include nodes 920 to 923, and the set of output nodes may include nodes 911 to 916. The sorting tool may then determine the longest path between any one of the input nodes and any one of the output nodes. In the operation unit graph 900 of FIG. 9A, the longest path lies between input node IN0 920 and output node N6 916 and has a length of six hops. As shown in FIG. 9A, the sorting tool has determined the first node as being the input node of the longest path (i.e., node IN0 920).

Subsequently, the sorting tool removes a next node-to-be-sorted (i.e., node IN0 920) from the ordered data structure 950, inserts the next node-to-be-sorted (IN0 920) as the currently inserted node at the current position (i.e., the first position) of the ordered sequence of nodes 970, and assigns a subsequent position of the ordered sequence of nodes 970 (i.e., the second position) as the current position of the ordered sequence of nodes 970.

Note that the ordered data structure (ODS) 950 and the ordered sequence of nodes (OSN) 970 are shown as linked lists of nodes in which the nodes earlier in the linked list have a higher priority of being handled for illustration purposes only. As mentioned above, the ordered sequence of nodes and/or the ordered data structure can include a linked list, a queue, a stack, a tree, or a heap. Illustratively, the ordered data structure is described as a min heap that is based on a series of three keys. However, the ordered data structure may be based on a different number of keys, if desired. As an example, the ordered data structure may be based on two keys. As another example, the ordered data structure may be based on four or more keys.

The sorting tool determines neighboring nodes of the currently inserted node IN0 920 from the set of unsorted nodes, whereby each one of the neighboring nodes is separated from the currently inserted node by one of the edges. In the example of FIG. 9A, the sorting tool determines nodes GRAD0 930, LOSS0 931, and N1 911 as neighboring nodes of IN0 920.

After the neighboring nodes have been determined, the sorting tool adds each one of the neighboring nodes as a node-to-be-sorted to the ordered data structure 950. For this purpose, the sorting tool may determine a ranking of nodes-to-be-ranked, whereby the nodes-to-be-ranked include the neighboring nodes (i.e., nodes GRAD0 930, LOSS0 931, and N1 911) and each node-to-be-sorted (i.e., currently none) in the ordered data structure 950.

Illustratively, for determining the ranking of the nodes-to-be-ranked, the sorting tool may determine a series of keys for each one of the nodes-to-be-ranked and base the ranking of the nodes-to-be-ranked on the series of keys. For example, the sorting tool may determine a key of the series of keys for a current node of the nodes-to-be-ranked based on a cost function of the current node of the nodes-to-be-ranked.

As an example, the cost function of the current node may be determined based on at least one criterion. As another example, the cost function of the current node may be based on a weighted sum of the at least one criterion and at least one additional criterion.

Illustratively, a criterion of the at least one criterion may include at least one of a number of nodes in the ordered sequence of nodes that is connected to the current node, a maximum bandwidth of all edges connected to the current node, a maximum bandwidth of any edge connected to the current node and another node in the ordered sequence of nodes, a minimum bandwidth of all edges connected to the current node, a minimum bandwidth of any edge connected to the current node and another node in the ordered sequence of nodes, a maximum fanout of the current node, a number of edges that are connected to the current node and part of a virtual channel, or a number of iterations that the current node has been in the ordered data structure while the next node-to-be-sorted has been removed from the ordered data structure, If desired, the sorting tool may determine the ranking of the nodes-to-be-ranked based on a first key in the series of keys. In the event that two or more nodes of the nodes-to-be-ranked have the same first key, the sorting tool may rank the nodes of the nodes-to-be-ranked with the same first key among themselves based on subsequent keys in the series of keys.

In the Example of FIGS. 9A to 9L, the ranking of the nodes-to-be-ranked is based on three different keys that are determined for each one of the nodes-to-be-ranked. The first key may be zero if a node-to-be-ranked has two or more input edges (or incoming edges) and all nodes that are connected via the two or more input edges with the node-to-be-ranked have already been sorted or if the node-to-be-ranked has an output edge with a fanout of two or more and all nodes that are connected via the output edge with the node-to-be-ranked have already been sorted. If desired, the first key may also be zero if an input edge of the node-to-be-ranked from another node is also an input edge to more than one other node (e.g., the output edge of the other node has a fanout of three and connects with the node-to-be-ranked and the more than one other node) and the other node as well as the more than one other node have already been sorted.

The second key may be based on the highest bandwidth (i.e., on the weight) of any edge that connects the node-to-be-ranked with any other already sorted node. In the scenario in which the sorting tool uses a min heap, the highest bandwidth requirements may be associated with the lowest key values and the lowest bandwidth requirements may be associated with the highest key values. For example, if the weights on the edges are greater than 0 (i.e., low bandwidth requirement) and smaller than or equal to one (i.e., high bandwidth requirement), the second key may be calculated as 1—maximum weight on any edge with an already sorted node.

The third key may be based on the insertion order into the ordered data structure 950. As an example, nodes that have a higher insertion order (i.e., that are later in the ordered data structure 950) may be sorted earlier than nodes with a lower insertion order. For example, add one to the third key of the node-to-be-ranked for every node that is sorted while the node-to-be-ranked is in the ordered data structure 950. In other words, for every iteration in which a node-to-be-ranked is in the ordered data structure 950, the third key increases by one.

In the example of FIG. 9A, the first key of nodes N1 911, GRAD0 930, and LOSS0 931 is one since neither one of nodes N1 911, GRAD0 930, and LOSS0 931 has two or more input edges and all nodes that are connected via the two or more input edges with the respective node have already been sorted. Furthermore, neither one of the nodes-to-be-ranked has an output edge with a fanout of two or more and all nodes-to-be-ranked that are connected via the output edge with the respective nodes have already been sorted. If at least two of the nodes-to-be-ranked have the same first key, the second key needs to be determined. In this case, since all nodes-to-be-ranked have the same first key, the second key of these nodes-to-be-ranked needs to be determined.

The second key of node N1 911 is 0.9 (1—the maximum weight of any one of the edges that connect node N1 911 to a previously sorted node (i.e. node IN0 920), which is the second key of node GRAD0 930 is 0, and the second key of node LOSS0 is 0.5. If at least two of the nodes to be inserted into the priority queue have the same first and second keys, the third key needs to be determined. In this case, since all nodes to be inserted into the ordered data structure 950 can be distinguished based on the first and second keys, a calculation of the third key may be omitted. However, since the third key increases by one at every iteration of the inner loop, the third key of nodes N1 911, GRAD0 930, and LOSS0 931 is set to 1.

After having determined the ranking of the nodes-to-be-ranked, the sorting tool adds each one of the neighboring nodes as a node-to-be-sorted to the ordered data structure 950. In some implementations, the sorting tool may insert each one of the neighboring nodes as a node-to-be-sorted according to the ranking into the ordered data structure 950. As illustratively shown in FIG. 9A, the nodes N1 911, GRAD0 930, and LOSS0 931 are inserted into the ordered data structure 950 according to the first, second, and third keys. Thus, node GRAD0 930 is inserted first into the ordered data structure 950 followed by node LOSS0 931 and node N1 911.

In a next operation, the sorting tool removes the currently inserted node (i.e., node IN0 920) from the set of unsorted nodes and repeats the inner loop since the ordered data structure 950 includes at least one unsorted node as shown in FIG. 9B.

Thus, FIG. 9B is a diagram of the illustrative operation unit graph 900 of FIG. 9A with a second node added to the ordered sequence of nodes 970.

Subsequently, the sorting tool removes a next node-to-be-sorted (i.e., node GRAD0 930) from the ordered data structure 950, inserts the next node-to-be-sorted (GRAD0 930) as the currently inserted node at the current position (i.e., the second position) of the ordered sequence of nodes 970, and assigns a subsequent position of the ordered sequence of nodes 970 (i.e., the third position) as the current position of the ordered sequence of nodes 970.

The sorting tool determines neighboring nodes of the currently inserted node GRAD0 920 from the set of unsorted nodes, whereby each one of the neighboring nodes is separated from the currently inserted node by one of the edges. In the example of FIG. 9B, the sorting tool determines nodes B0 921, and N2 912 as neighboring nodes of GRAD0 930.

After the neighboring nodes have been determined, the sorting tool adds each one of the neighboring nodes as a node-to-be-sorted to the ordered data structure 950. For this purpose, the sorting tool may determine a ranking of nodes-to-be-ranked, whereby the nodes-to-be-ranked include the neighboring nodes (i.e., nodes B0 921 and N2 912) and each node-to-be-sorted (i.e., nodes GRAD0 930, LOSS0 931, and N1 911) in the ordered data structure 950.

In the example of FIG. 9B, the first key of node LOSS0 931 may be updated to zero since all nodes that are connected to a fan-in net into node LOSS0 931 (i.e., nodes IN0 920 and GRAD0 930) have already been sorted. The second key of node LOSS0 931 remains unchanged, and the third key is incremented to two. The first key of nodes B0 921, N2 912, and N1 911 is equal to one since neither one of these nodes has two or more input edges and all nodes that are connected via the two or more input edges with the respective node have already been sorted. Furthermore, neither one of these nodes has an output edge with a fanout of two or more and all nodes that are connected via the output edge with the respective nodes have already been sorted.

The second key of nodes LOSS0 931, B0 921, N2 912, and N1 911 is equal to 1—the maximum weight of any one of the edges that connect the respective node a previously sorted node (i.e. nodes IN0 920 and GRAD0 930). Thus, the second key of nodes LOSS0 931, B0 921, N2 912, and N1 911 is 0.5, 0.3, 0.9, and 0.9, respectively.

The third key of nodes LOSS0 931, B0 921, N2 912, and N1 911 is set to the number of iterations that the respective node is in the ordered data structure (ODS) 950. Thus, the third key of nodes LOSS0 931 and N1 911 is set to two, and the third key of nodes B0 921 and N2 912 is set to one.

Thus, the nodes that are currently inserted into the ordered data structure 950 have the following keys shown in the format node name (first key, second key, third key): LOSS0 931 (0, 0.5, 2), B0 921 (1, 0.3, 1), N2 912 (1, 0.9, 1), N1 911 (1, 0.9, 2).

After having determined the ranking of the nodes-to-be-ranked, the sorting tool adds each one of the neighboring nodes as a node-to-be-sorted to the ordered data structure 950. For example, the sorting tool may rearrange each node-to-be-sorted in the ordered data structure according to the ranking and insert each one of the neighboring nodes as a node-to-be-sorted according to the ranking into the ordered data structure. Instead, all nodes-to-be-sorted may be removed from the ordered data structure 950 and be reintroduced together with the neighboring nodes according to the ranking. In the remainder of the description, the ordered data structure 950 is represented after the rearrangement and insertion or the removal and reintroduction with the neighboring nodes has taken place.

Thus, the new order of the nodes in the ordered data structure 950 is LOSS0 931 followed by B0 921, N2 912, and N1 911.

Figure 9C:
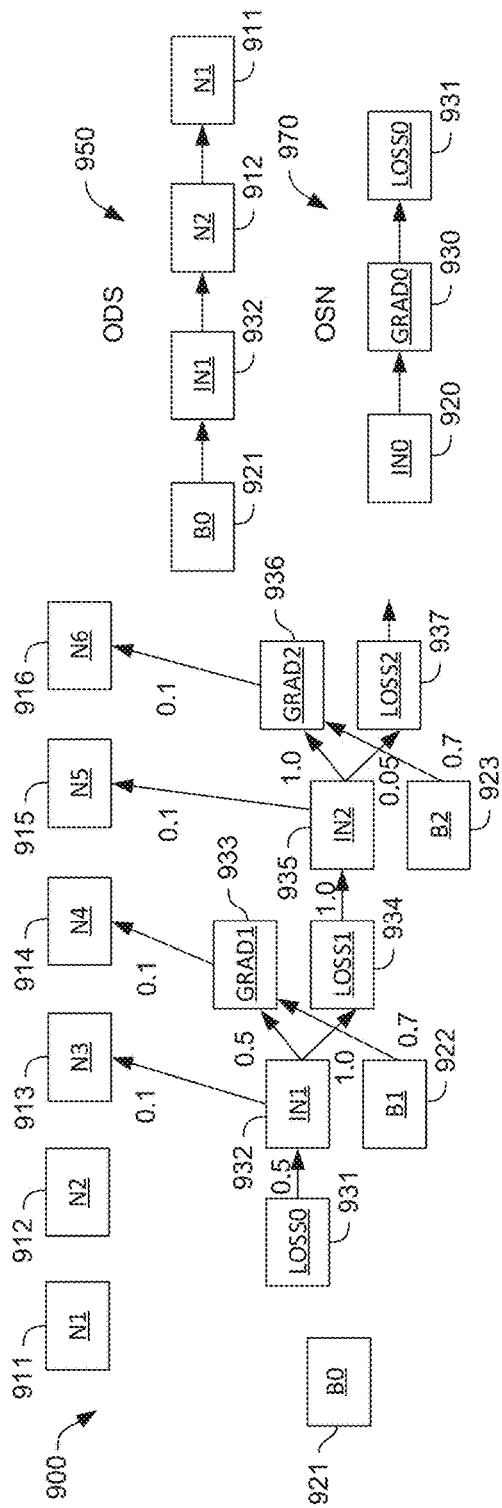
FIG. 9C is a diagram of the illustrative operation unit graph of FIG. 9B with a third node added to the ordered sequence of nodes.

In a next operation, the sorting tool removes the currently inserted node (i.e., node GRAD0 930) from the set of unsorted nodes and repeats the inner loop since the ordered data structure 950 includes at least one unsorted node as shown in FIG. 9C.

Thus, FIG. 9C is a diagram of the illustrative operation unit graph 900 of FIG. 9B with a third node added to the ordered sequence of nodes 970.

Subsequently, the sorting tool removes node LOSS0 931 from the ordered data structure 950, inserts LOSS0 931 as the currently inserted node at the current position (i.e., the third position) of the ordered sequence of nodes 970, and assigns a subsequent position of the ordered sequence of nodes 970 (i.e., the fourth position) as the current position of the ordered sequence of nodes 970.

The sorting tool determines neighboring nodes of the currently inserted node LOSS0 931 from the set of unsorted nodes. In the example of FIG. 9C, the sorting tool determines node IN1 932 from the set of unsorted nodes as neighboring node of LOSS0 931.

After the neighboring node has been determined, the sorting tool determines a ranking of nodes-to-be-ranked, whereby the nodes-to-be-ranked include the neighboring node IN1 932 and each node-to-be-sorted (i.e., nodes B0 921, N2 912, and N1 911) in the ordered data structure 950.

In the example of FIG. 9C, the first key of nodes B0 921, IN1 932, N2 912, and N1 911 is equal to one since neither one of these nodes has two or more input edges and all nodes that are connected via the two or more input edges with the respective node have already been sorted. Furthermore, neither one of these nodes has an output edge with a fanout of two or more and all nodes that are connected via the output edge with the respective nodes have already been sorted.

The second key of nodes B0 921, IN1 932, N2 912, and N1 911 is equal to 1—the maximum weight of any one of the edges that connect the respective node a previously sorted node (i.e. nodes IN0 920, GRAD0 930, and LOSS0 931). Thus, the second key of nodes B0 921, IN1 932, N2 912, and N1 911 is 0.3, 0.5, 0.9, and 0.9, respectively.

The third key of nodes B0 921, IN1 932, N2 912, and N1 911 is set to the number of iterations that the respective node is in the ordered data structure 950. Thus, the third key of node N1 911 is set to three, the third key of nodes B0 921 and N2 912 is set to two, and the third key of node IN1 932 is set to one.

Thus, the nodes-to-be-ranked have the following keys shown in the format node name (first key, second key, third key): B0 921 (1, 0.3, 2), IN1 932 (1, 0.5, 1), N2 912 (1, 0.9, 2), N1 911 (1, 0.9, 3). After having determined the ranking of the nodes-to-be-ranked, the new order of the nodes in the ordered data structure 950 is B0 921 followed by IN1 932, N2 912, and N1 911.

Figure 9D:
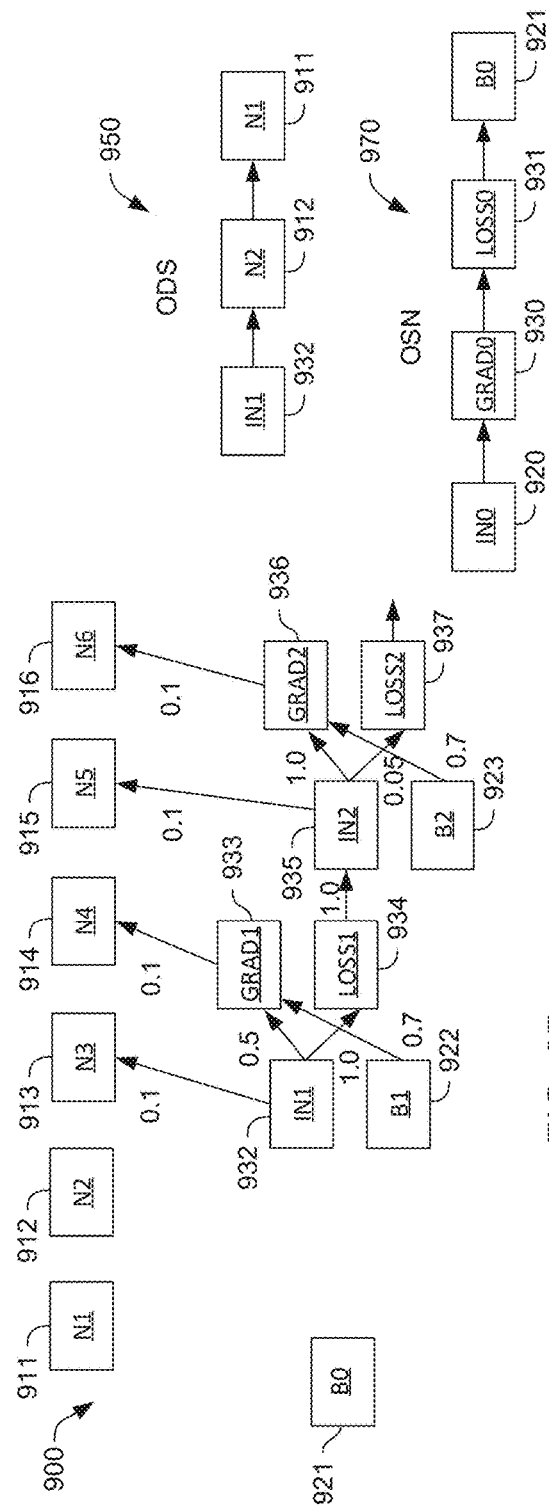
FIG. 9D is a diagram of the illustrative operation unit graph of FIG. 9C with a fourth node added to the ordered sequence of nodes.

In a next operation, the sorting tool removes the currently inserted node (i.e., node LOSS0 930) from the set of unsorted nodes and repeats the inner loop since the ordered data structure 950 includes at least one unsorted node as shown in FIG. 9D.

Thus, FIG. 9D is a diagram of the illustrative operation unit graph 900 of FIG. 9C with a fourth node added to the ordered sequence of nodes 970.

Subsequently, the sorting tool removes node B0 921 from the ordered data structure 950, inserts B0 921 as the currently inserted node at the fourth position of the ordered sequence of nodes 970, and assigns the fifth position as the current position of the ordered sequence of nodes 970.

Currently inserted node B0 921 has no neighboring nodes in the set of unsorted nodes. However, the first, second, and third keys of nodes-to-be-sorted may be updated and the ordered data structure 950 updated accordingly.

In the example of FIG. 9D, the first and second keys of nodes IN1 932, N2 912, and N1 911 remain unchanged, whereas the third key of nodes IN1 932, N2 912, and N1 911 is set to the number of iterations that the respective node is in the ordered data structure 950. Thus, the third key of node N1 911 is set to four, the third key of node N2 912 is set to three, and the third key of node IN1 932 is set to two.

Thus, the nodes-to-be-ranked that are currently inserted into the ordered data structure 950 have the following keys shown in the format node name (first key, second key, third key): in1 (1, 0.5, 2), 2 (1, 0.9, 3), 1 (1, 0.9, 4). Thus, the order of inserting the nodes into the ordered data structure 950 is IN1 932 followed by N2 912, and N1 911.

Figure 9E:
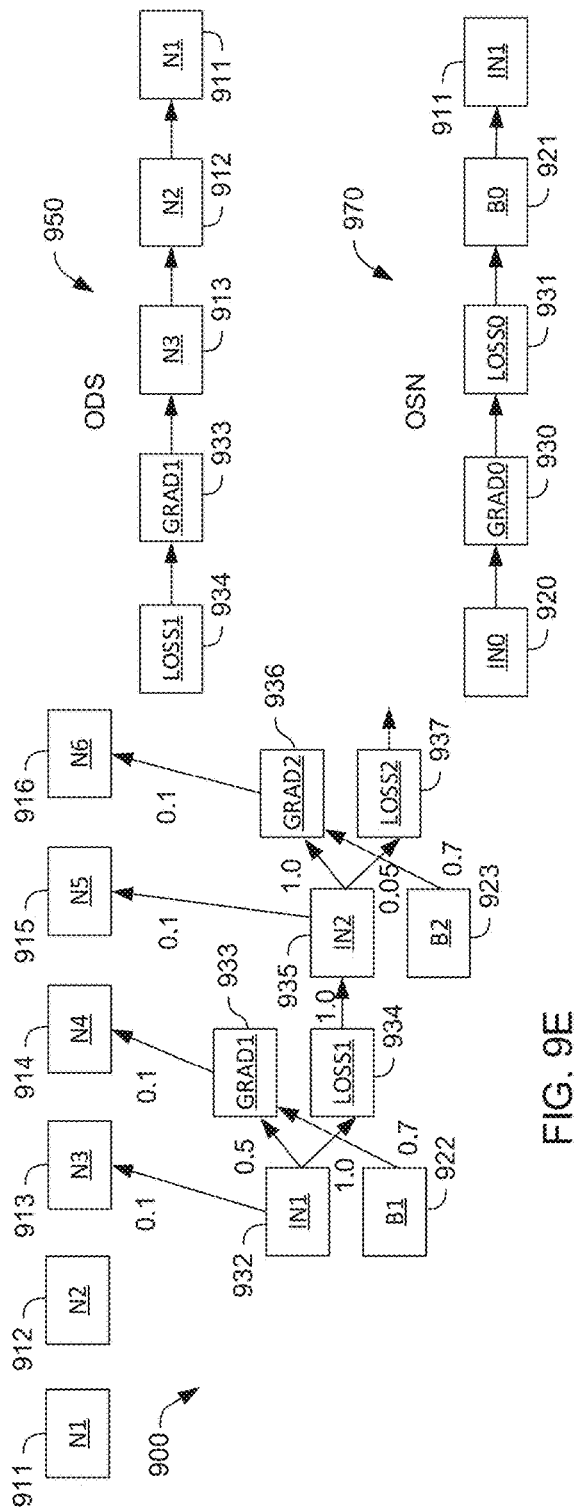
FIG. 9E is a diagram of the illustrative operation unit graph of FIG. 9D with a fifth node added to the ordered sequence of nodes.

In a next operation, the sorting tool removes the currently inserted node (i.e., node B0 921) from the set of unsorted nodes and repeats the inner loop since the ordered data structure 950 includes at least one unsorted node as shown in FIG. 9E.

Thus, FIG. 9E is a diagram of the illustrative operation unit graph 900 of FIG. 9D with a fifth node added to the ordered sequence of nodes 970.

Subsequently, the sorting tool removes node IN1 932 from the ordered data structure 950, inserts IN1 932 as the currently inserted node at the fifth position of the ordered sequence of nodes 970, and assigns the sixth position as the current position of the ordered sequence of nodes 970.

The sorting tool determines neighboring nodes of the currently inserted node IN1 932 from the set of unsorted nodes. In the example of FIG. 9E, the sorting tool determines nodes GRAD1 933, LOSS1 934, and N3 913 as neighboring node of IN1 932.

After the neighboring nodes have been determined, the sorting tool determines a ranking of the nodes-to-be-ranked, whereby the nodes-to-be-ranked include the neighboring nodes GRAD1 933, LOSS1 934, and N3 913 and each node-to-be-sorted (i.e., nodes N2 912, and N1 911) in the ordered data structure 950.

In the example of FIG. 9E, the following keys shown in the format node name (first key, second key, third key) have been determined: LOSS1 934 (1, 0, 1), GRAD1 933 (1, 1), N3 913 (1, 0.9, 1), N2 912 (1, 0.9, 4), N1 911 (1, 0.9, 5). Thus, the order of inserting the nodes into the ordered data structure 950 is LOSS1 934 followed by GRAD1 933, N3 913, N2 912, and N1 911.

Figure 9F:
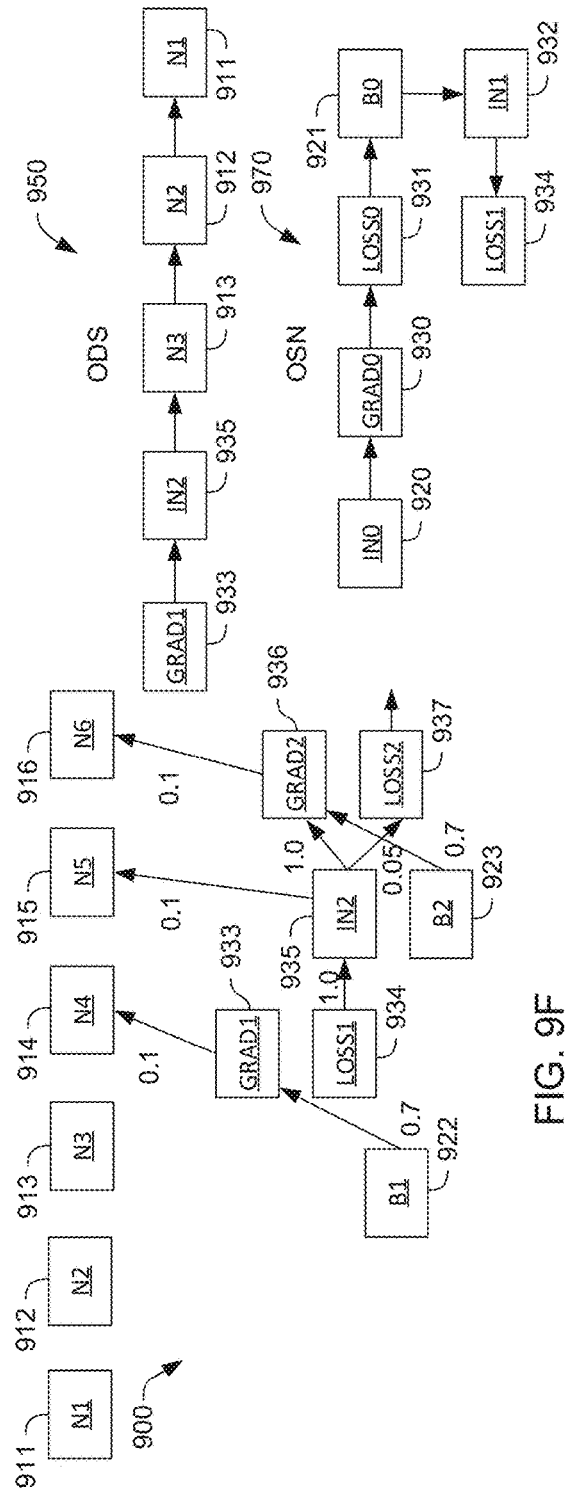
FIG. 9F is a diagram of the illustrative operation unit graph of FIG. 9E with a sixth node added to the ordered sequence of nodes.

In a next operation, the sorting tool removes the currently inserted node (i.e., node IN1 932) from the set of unsorted nodes and repeats the inner loop since the ordered data structure 950 includes at least one unsorted node as shown in FIG. 9F.

Thus, FIG. 9F is a diagram of the illustrative operation unit graph 900 of FIG. 9E with a sixth node added to the ordered sequence of nodes 970.

Subsequently, the sorting tool removes node LOSS1 934 from the ordered data structure 950, inserts LOSS1 934 as the currently inserted node at the sixth position of the ordered sequence of nodes 970, and assigns the seventh position as the current position of the ordered sequence of nodes 970.

The sorting tool determines neighboring node IN2 935 of the currently inserted node LOSS1 934 from the set of unsorted nodes and determines a ranking of the nodes-to-be-ranked, whereby the nodes-to-be-ranked include the neighboring node IN2 935 and each node-to-be-sorted (i.e., nodes GRAD1 933, N3 913, N2 912, and N1 911) in the ordered data structure 950.

In the example of FIG. 9F, the following keys shown in the format node name (first key, second key, third key) have been determined: GRAD1 933 (0, 0.5, 2), IN2 935 (1, 1), N3 913 (1, 0.9, 2), N2 912 (1, 0.9, 5), N1 911 (1, 0.9, 6). Thus, the order of inserting the nodes into the ordered data structure 950 is GRAD1 933 followed by IN2 935, N3 913, N2 912, and N1 911.

In a next operation, the sorting tool removes the currently inserted node (i.e., node LOSS1 934) from the set of unsorted nodes and repeats the inner loop since the ordered data structure 950 includes at least one unsorted node as shown in FIG. 9G.

Thus, FIG. 9G is a diagram of the illustrative operation unit graph 900 of FIG. 9F with a seventh node added to the ordered sequence of nodes 970.

Subsequently, the sorting tool removes node GRAD1 933 from the ordered data structure 950, inserts GRAD1 933 as the currently inserted node at the seventh position of the ordered sequence of nodes 970, and assigns the eighth position as the current position of the ordered sequence of nodes 970.

The sorting tool determines neighboring nodes B1 922 and N4 914 of the currently inserted node GRAD1 933 from the set of unsorted nodes and determines a ranking of the nodes-to-be-ranked, whereby the nodes-to-be-ranked include the neighboring nodes B1 922 and N4 914 and each node-to-be-sorted (i.e., nodes N3 913, N2 912, and N1 911) in the ordered data structure 950.

In the example of FIG. 9G, the following keys shown in the format node name (first key, second key, third key) have been determined: B1 922 (1, 0.3, 1), IN2 935 (1, 0, 2), N4 914 (1, 0.9, 1), N3 913 (1, 0.9, 3), N2 912 (1, 0.9, 6), N1 911 (1, 0.9, 7). Thus, the order of inserting the nodes into the ordered data structure 950 is IN2 935 followed by B1 922, N4 914, N3 913, N2 912, and N1 911.

In a next operation, the sorting tool removes the currently inserted node (i.e., node GRAD1 933) from the set of unsorted nodes and repeats the inner loop since the ordered data structure 950 includes at least one unsorted node as shown in FIG. 9H.

Thus, FIG. 9H is a diagram of the illustrative operation unit graph 900 of FIG. 9G with an eighth node added to the ordered sequence of nodes 970.

Subsequently, the sorting tool removes node IN2 935 from the ordered data structure 950, inserts IN2 935 as the currently inserted node at the eighth position of the ordered sequence of nodes 970, and assigns the ninth position as the current position of the ordered sequence of nodes 970.

The sorting tool determines neighboring nodes GRAD2 936, LOSS2 937, and N5 915 of the currently inserted node IN2 935 from the set of unsorted nodes and determines a ranking of the nodes-to-be-ranked, whereby the nodes-to-be-ranked include the neighboring nodes GRAD2 936, LOSS2 937, and N5 915 and each node-to-be-sorted (i.e., nodes B1 922, N4 914, N3 913, N2 912, and N1 911) in the ordered data structure 950.

In the example of FIG. 9H, the following keys shown in the format node name (first key, second key, third key) have been determined: GRAD2 936 (1, 0, 1), LOSS2 937 (1, 0.95, 1), N5 915 (1, 0.9, 1), B1 922 (1, 0.3, 2), N4 914 (1, 0.9, 2), N3 913 (1, 0.9, 4), N2 912 (1, 0.9, 7), N1 911 (1, 0.9, 8). Thus, the order of inserting the nodes into the ordered data structure 950 is GRAD2 936 followed by B1 922, N5 915, N4 914, N3 913, N2 912, N1 911, and LOSS2 937.

In a next operation, the sorting tool removes the currently inserted node (i.e., node IN2 935) from the set of unsorted nodes and repeats the inner loop since the ordered data structure 950 includes at least one unsorted node as shown in FIG. 9I.

Thus, FIG. 9I is a diagram of the illustrative operation unit graph 900 of FIG. 9H with a ninth node added to the ordered sequence of nodes 970.

Subsequently, the sorting tool removes node GRAD2 936 from the ordered data structure 950, inserts GRAD2 936 as the currently inserted node at the ninth position of the ordered sequence of nodes 970, and assigns the tenth position as the current position of the ordered sequence of nodes 970.

The sorting tool determines neighboring nodes B2 923 and N6 916 of the currently inserted node GRAD2 936 from the set of unsorted nodes and determines a ranking of the nodes-to-be-ranked, whereby the nodes-to-be-ranked include the neighboring nodes B2 923 and N6 916 and each node-to-be-sorted (i.e., nodes B1 922, LOSS2 937, N5 915, N4 914, N3 913, N2 912, and N1 911) in the ordered data structure 950.

In the example of FIG. 9I, the following keys shown in the format node name (first key, second key, third key) have been determined: LOSS2 937 (0, 0.95, 2), B2 923 (1, 1), B1 922 (1, 0.3, 3), N6 916 (1, 0.9, 1), N5 915 (1, 0.9, 2), N4 914 (1, 0.9, 3), N3 913 (1, 5), N2 912 (1, 0.9, 8), N1 911 (1, 0.9, 9). Thus, the order of inserting the nodes into the ordered data structure 950 is LOSS2 937 followed by B2 923, B1 922, N6 916, N5 915, N4 914, N3 913, N2 912, and N1 911.

In a next operation, the sorting tool removes the currently inserted node (i.e., node GRAD2 936) from the set of unsorted nodes and repeats the inner loop since the ordered data structure 950 includes at least one unsorted node as shown in FIG. 9J.

Thus, FIG. 9J is a diagram of the illustrative operation unit graph 900 of FIG. 9I with a tenth node added to the ordered sequence of nodes 970.

Subsequently, the sorting tool removes node LOSS2 937 from the ordered data structure 950, inserts LOSS2 937 as the currently inserted node at the tenth position of the ordered sequence of nodes 970, and assigns the eleventh position as the current position of the ordered sequence of nodes 970.

The sorting tool determines neighboring nodes of the currently inserted node LOSS2 937 from the set of unsorted nodes. Since all nodes in the set of nodes are unconnected now, no neighboring nodes are found. Moreover, as a result, the ordered data structure keeps the remaining nodes in the same order since only the third key of every node is increased by one at every iteration. Thus, the order of inserting the nodes into the ordered data structure 950 is B2 923 followed by B1 922, N6 916, N5 915, N4 914, N3 913, N2 912, and N1 911.

Figure 9K:
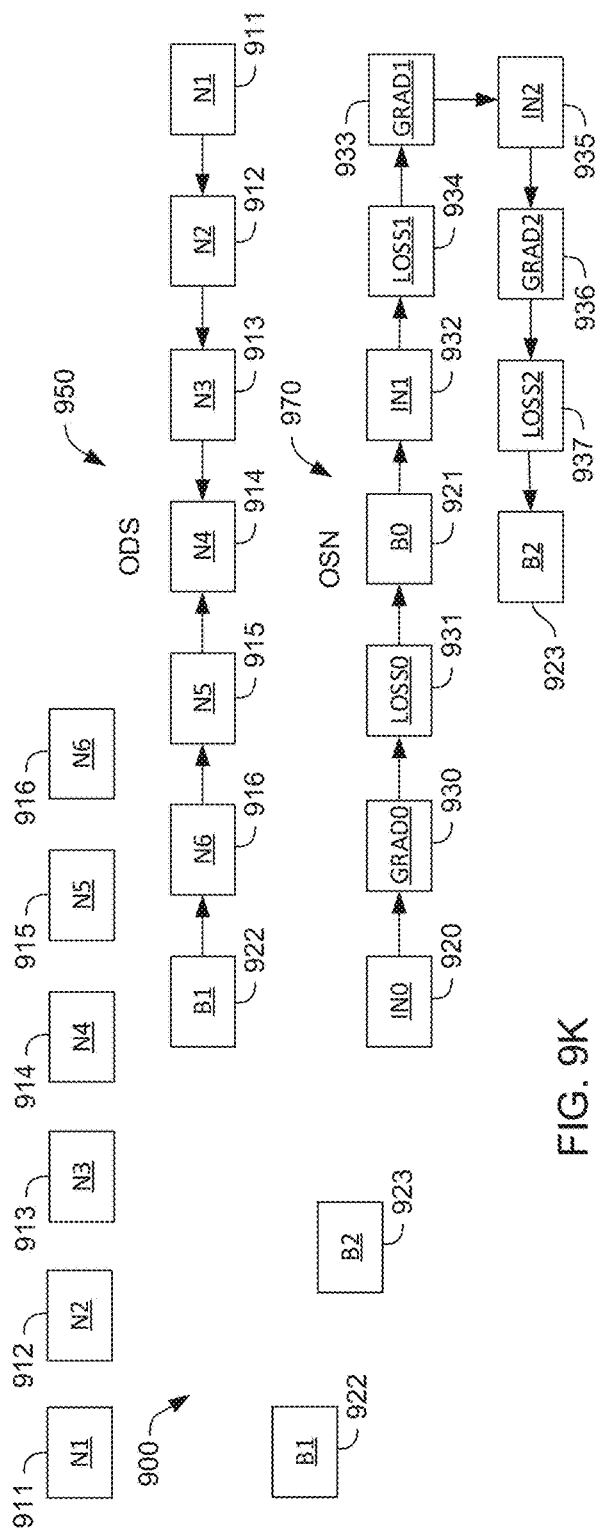
FIG. 9K is a diagram of the illustrative operation unit graph of FIG. 9J with an eleventh node added to the ordered sequence of nodes.

In a next operation, the sorting tool removes the currently inserted node (i.e., node B2 923) from the set of unsorted nodes and repeats the inner loop since the ordered data structure 950 includes at least one unsorted node as shown in FIG. 9K.

Thus, FIG. 9K is a diagram of the illustrative operation unit graph 900 of FIG. 9J with an eleventh node added to the ordered sequence of nodes 970.

Subsequently, the sorting tool removes node B2 923 from the ordered data structure 950, inserts B2 923 as the currently inserted node at the eleventh position of the ordered sequence of nodes 970, and assigns the twelfth position as the current position of the ordered sequence of nodes 970. As mentioned above, the order of inserting the nodes into the ordered data structure 950 remains unchanged and is B1 922 followed by N6 916, N5 915, N4 914, N3 913, N2 912, and N1 911.

Figure 9L:
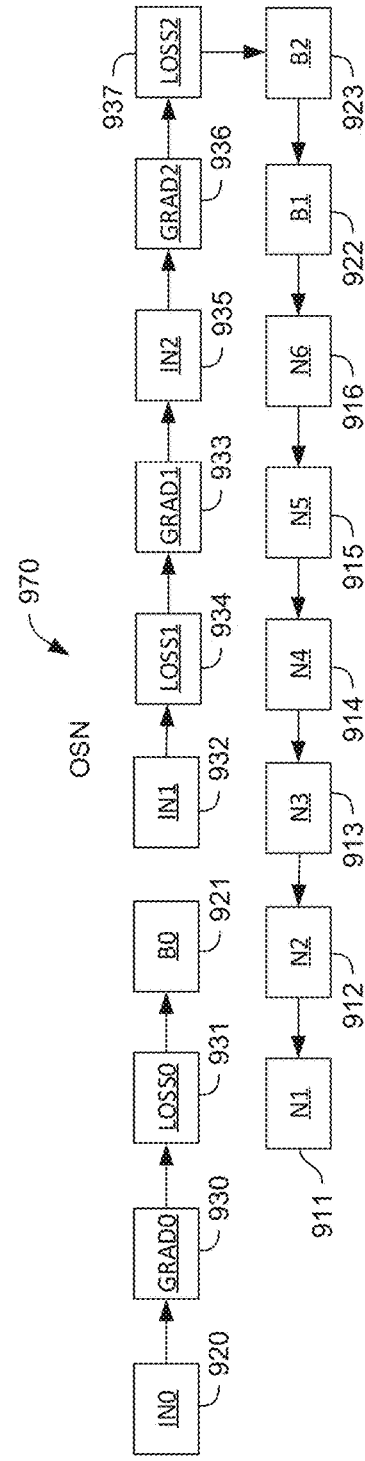
FIG. 9L is a diagram of the illustrative operation unit graph of FIG. 9K with the remaining nodes of the operation unit graph added to the ordered sequence of nodes.

In subsequent iterations, all nodes are removed one by one from the ordered data structure 950 and inserted in subsequent positions of the ordered sequence of nodes 970 until the ordered data structure 950 is empty as shown in FIG. 9L.

The sorting tool then provides the ordered sequence of nodes 970 that includes nodes IN0 920, GRAD0 930, LOSS0 931, B0 921, IN1 932, LOSS1 934, IN2 935, GRAD2 936, LOSS2 937, B2 923, B1 922, N6 916, N5 915, N4 914, N3 913, N2 912, and N1 911 in that order as shown in FIG. 9L to a placer and router (e.g., placer and router 870 of FIG. 8) for the placing and routing of the operation unit graph 900 onto a reconfigurable processor.

Figure 10:
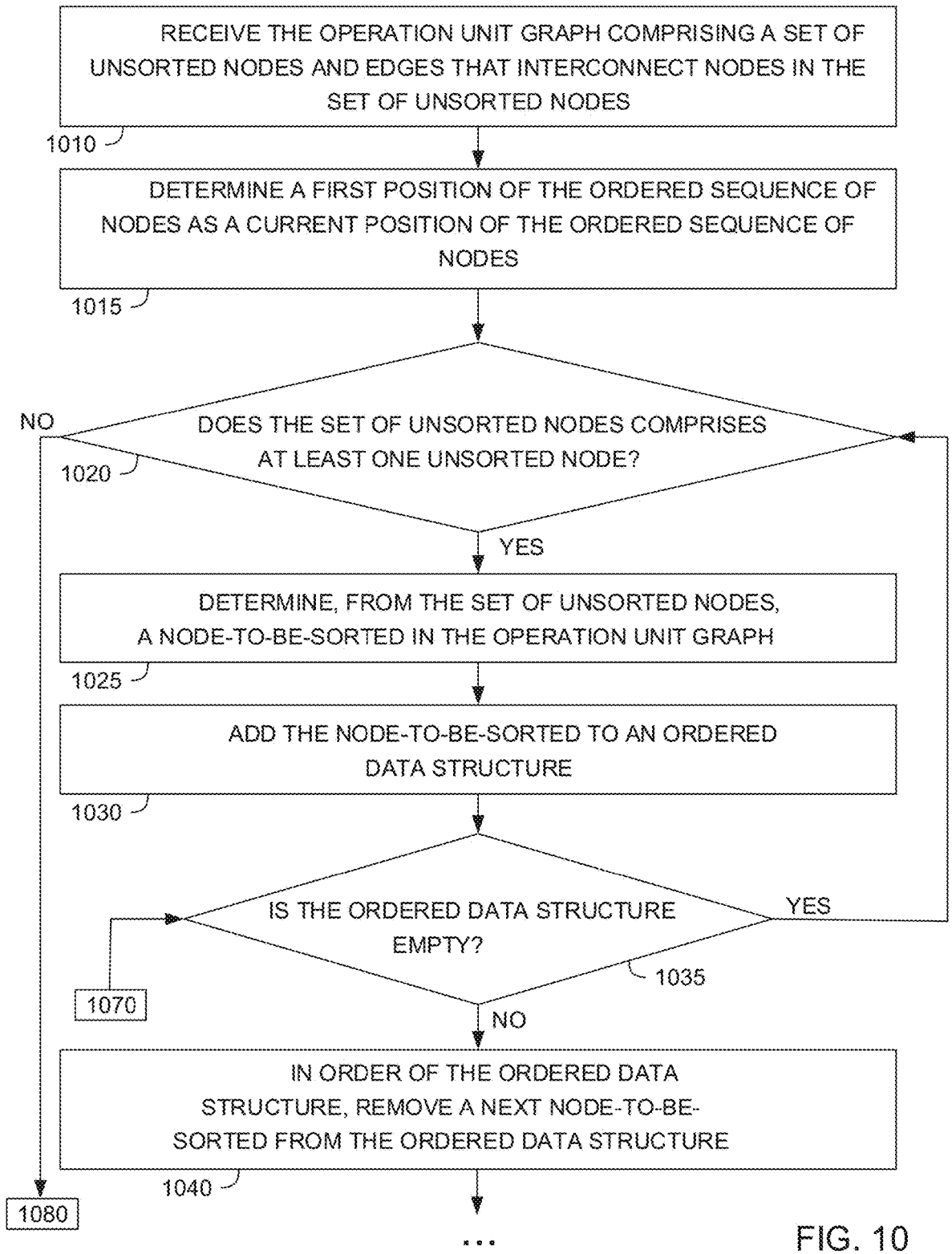
FIG. 10 is a flowchart showing illustrative operations that a sorting tool performs for determining an ordered sequence of nodes in an operation unit graph for placing and routing the operation unit graph onto a reconfigurable processor.
Figure 10:
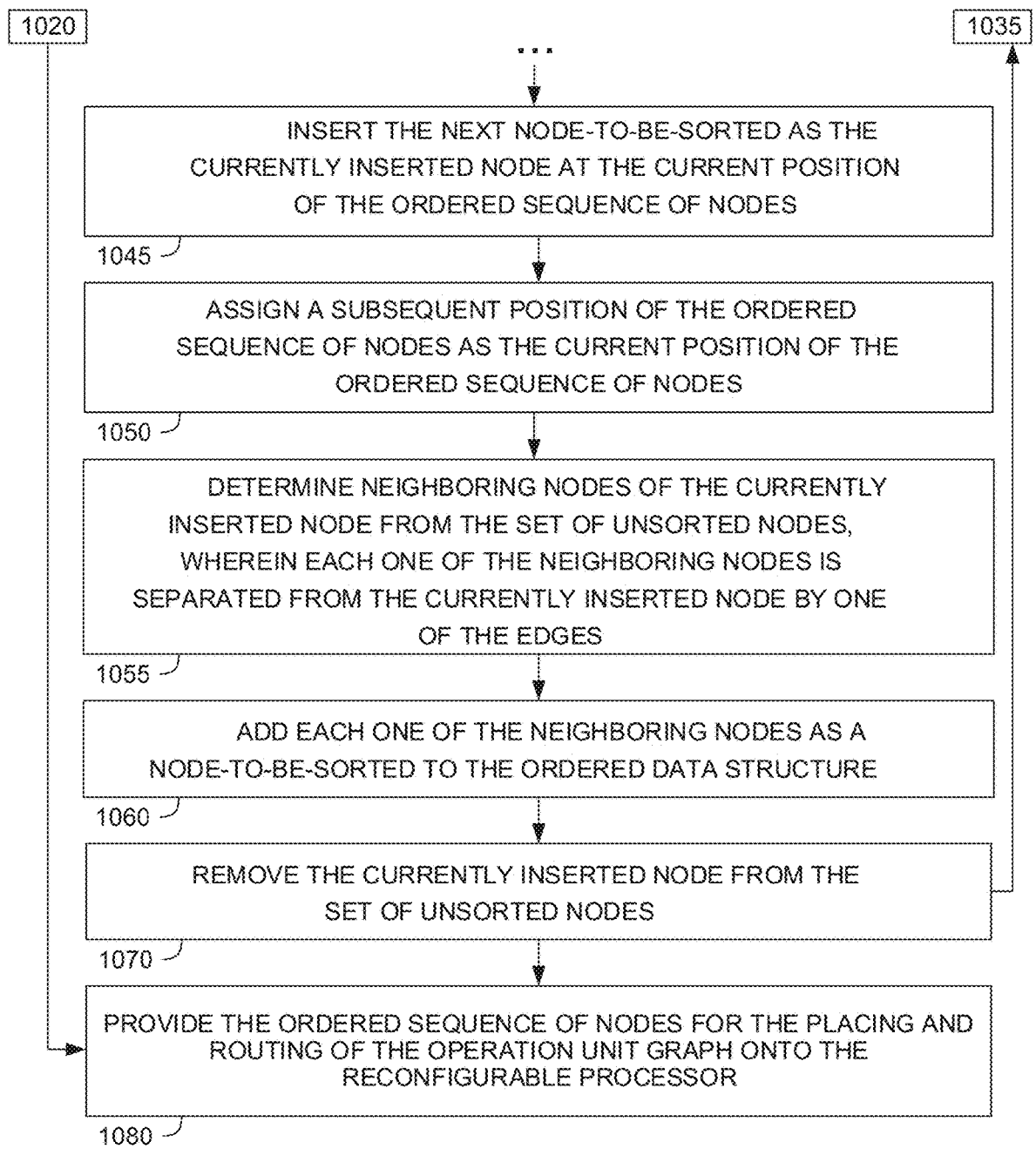

FIG. 10 is a flowchart 1000 showing illustrative operations that a sorting tool (e.g., sorting tool 810 of FIG. 8 or sorting tool 640 of FIG. 6) performs for determining an ordered sequence of nodes in an operation unit graph for placing and routing the operation unit graph onto a reconfigurable processor.

During operation 1010, the sorting tool receives the operation unit graph comprising a set of unsorted nodes and edges that interconnect nodes in the set of unsorted nodes. For example, the sorting tool may receive operation unit graph 900 of FIG. 9A with a set of unsorted nodes 911 to 916, 920 to 923, and 930 to 937 and edges that interconnect the nodes in the set of unsorted nodes.

During operation 1015, the sorting tool determines a first position of the ordered sequence of nodes as a current position of the ordered sequence of nodes. For example, the sorting tool may determine the first position in the ordered sequence of nodes 970 of FIG. 9A as the current position of the ordered sequence of nodes.

During operation 1020, the sorting tool determines whether the set of unsorted nodes comprises at least one unsorted node.

In response to determining that the set of unsorted nodes fails to comprise at least one unsorted node, the sorting tool provides the ordered sequence of nodes for the placing and routing of the operation unit graph onto the reconfigurable processor during operation 1080.

In response to determining that the set of unsorted nodes comprises at least one unsorted node, the sorting tool determines, from the set of unsorted nodes, a node-to-be-sorted in the operation unit graph during operation 1025.

For example, the sorting tool may determine a set of input nodes in the set of unsorted nodes, whereby input nodes in the set of input nodes exclusively transmit data over the edges to other nodes in the set of unsorted nodes. In some implementations, the sorting tool may determine a provisioned bandwidth for each edge of the edges that is connected to an input node of the input nodes. The sorting tool may then select as the node-to-be-sorted the input node among the input nodes that is connected to the edge of the edges with a greatest provisioned bandwidth.

If desired, the sorting tool may determine a set of output nodes in the set of unsorted nodes, whereby output nodes in the set of output nodes exclusively receive data over the edges from other nodes in the set of unsorted nodes. As an example, the sorting tool may determine a provisioned bandwidth for each edge of the edges that is connected to an output node in the set of output nodes and select as the node-to-be-sorted the output node among the output nodes that is connected to the edge of the edges with a greatest provisioned bandwidth.

Illustratively, the sorting tool may determine a longest path in the operation unit graph, whereby the longest path starts from a first node in the set of input nodes and ends at a second node in the set of output nodes and select the first node or the second node as the node-to-be-sorted, if desired. For example, the sorting tool may determine the longest path in the operation unit graph 900 of FIG. 9A between input node IN0 920 and output node N6 916 and select node IN0 920 as the node-to-be-sorted.

During operation 1030, the sorting tool adds the node-to-be-sorted to an ordered data structure. For example, the sorting tool may add node IN0 920 of FIG. 9A to the ordered data structure (ODS) 950.

During operation 1035, the sorting tool determines whether the ordered data structure is empty. As an example, the ordered data structure 950 of FIG. 9A will be empty when all unsorted nodes in operation unit graph 900 that are connected to node IN0 920 either directly or via other nodes have been sorted. In response to determining that the ordered data structure is empty, the sorting tool returns to operation 1020. For example, if the operation unit graph includes two connected subgraphs that are unconnected with each other, the sorting tool may return to operation 1020 after the first connected subgraph has been sorted.

In response to determining that the ordered data structure is empty, the sorting tool removes a next node-to-be-sorted from the ordered data structure in order of the ordered data structure during operation 1040. For example, the sorting tool may remove node IN0 920 of FIG. 9A from the ordered data structure 950.

During operation 1045, the sorting tool inserts the next node-to-be-sorted as the currently inserted node at the current position of the ordered sequence of nodes. For example, the sorting tool may insert node IN0 920 which is the next node-to-be-sorted as the currently inserted node at the first position of the ordered sequence of nodes 970.

During operation 1050, the sorting tool assigns a subsequent position of the ordered sequence of nodes as the current position of the ordered sequence of nodes. For example, the sorting tool may assign the second position of the ordered sequence of nodes 970 of FIG. 9A as the current position of the ordered sequence of nodes 970.

During operation 1055, the sorting tool determines neighboring nodes of the currently inserted node from the set of unsorted nodes, whereby each one of the neighboring nodes is separated from the currently inserted node by one of the edges. For example, the sorting tool may determine nodes GRAD0 930, LOSS0 931, and N1 911 of FIG. 9A as the neighboring nodes of node IN0 920.

During operation 1060, the sorting tool adds each one of the neighboring nodes as a node-to-be-sorted to the ordered data structure. For example, the sorting tool may add nodes GRAD0 930, LOSS0 931, and N1 911 of FIG. 9A as nodes-to-be-sorted to the ordered data structure 950.

Illustratively, the sorting tool may determine a ranking of nodes-to-be-ranked, wherein the nodes-to-be-ranked include the neighboring nodes and each node-to-be-sorted in the ordered data structure. The sorting tool may then rearrange each node-to-be-sorted in the ordered data structure according to the ranking and insert each one of the neighboring nodes as a node-to-be-sorted according to the ranking into the ordered data structure.

For determining the ranking of the nodes-to-be-ranked, the sorting tool may determine a series of keys for each one of the nodes-to-be-ranked. If desired, the sorting tool may base the ranking of the nodes-to-be-ranked on the series of keys.

For determining the series of keys for each one of the nodes-to-be-ranked, the sorting tool may determine a key of the series of keys for a current node of the nodes-to-be-ranked based on a cost function of the current node of the nodes-to-be-ranked.

In some implementations, the cost function of the current node is determined based on at least one criterion. If desired, the cost function of the current node is based on a weighted sum of the at least one criterion and at least one additional criterion.

A criterion of the at least one criterion comprises at least one of: a number of nodes in the ordered sequence of nodes that is connected to the current node, a maximum bandwidth of all edges connected to the current node, a maximum bandwidth of any edge connected to the current node and another node in the ordered sequence of nodes, a minimum bandwidth of all edges connected to the current node, a minimum bandwidth of any edge connected to the current node and another node in the ordered sequence of nodes, a maximum fanout of the current node, a number of edges that are connected to the current node and part of a virtual channel, or a number of iterations that the current node has been in the ordered data structure while the next node-to-be-sorted has been removed from the ordered data structure.

Illustratively, the sorting tool may determine the ranking of the nodes-to-be-ranked based on a first key in the series of keys. In the event in which nodes of the nodes-to-be-ranked have the same first key, the sorting tool may rank the nodes of the nodes-to-be-ranked with the same first key among themselves based on subsequent keys in the series of keys.

During operation 1070, the sorting tool removes the currently inserted node from the set of unsorted nodes. For example, the sorting tool may remove IN0 920 from the set of unsorted nodes as shown in the transition from FIG. 9A in which node IN0 920 is still in the set of unsorted nodes to FIG. 9B in which node IN0 920 has been removed from the set of unsorted nodes. After operation 1070, the sorting tool returns to operation 1035.

If desired, a non-transitory computer-readable storage medium includes instructions that, when executed by a processing unit (e.g., host processor 180 of FIG. 1), cause the processing unit to operate a sorting tool (e.g., the sorting tool 640 of FIG. 6 or the sorting tool 810 of FIG. 8) for determining an ordered sequence of nodes in an operation unit graph for placing and routing the operation unit graph onto a reconfigurable processor by performing operations 1010 to 1080 of FIG. 10.

The instructions may include receiving the operation unit graph comprising a set of unsorted nodes and edges that interconnect nodes in the set of unsorted nodes; determining a first position of the ordered sequence of nodes as a current position of the ordered sequence of nodes; repeating as long as the set of unsorted nodes comprises at least one unsorted node: determining, from the set of unsorted nodes, a node-to-be-sorted in the operation unit graph; adding the node-to-be-sorted to an ordered data structure; repeating until the ordered data structure is empty: in order of the ordered data structure, removing a next node-to-be-sorted from the ordered data structure, inserting the next node-to-be-sorted as the currently inserted node at the current position of the ordered sequence of nodes, assigning a subsequent position of the ordered sequence of nodes as the current position of the ordered sequence of nodes, determining neighboring nodes of the currently inserted node from the set of unsorted nodes, wherein each one of the neighboring nodes is separated from the currently inserted node by one of the edges, adding each one of the neighboring nodes as a node-to-be-sorted to the ordered data structure, removing the currently inserted node from the set of unsorted nodes; and providing the ordered sequence of nodes for the placing and routing of the operation unit graph onto the reconfigurable processor.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms.

Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory.

A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic.

The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a method of operating a sorting tool for determining an ordered sequence of nodes in an operation unit graph for placing and routing the operation unit graph onto a reconfigurable processor, comprising: receiving the operation unit graph comprising a set of unsorted nodes and edges that interconnect nodes in the set of unsorted nodes; determining a first position of the ordered sequence of nodes as a current position of the ordered sequence of nodes; repeating as long as the set of unsorted nodes comprises at least one unsorted node: determining, from the set of unsorted nodes, a node-to-be-sorted in the operation unit graph; adding the node-to-be-sorted to an ordered data structure; repeating until the ordered data structure is empty: in order of the ordered data structure, removing a next node-to-be-sorted from the ordered data structure, inserting the next node-to-be-sorted as the currently inserted node at the current position of the ordered sequence of nodes, assigning a subsequent position of the ordered sequence of nodes as the current position of the ordered sequence of nodes, determining neighboring nodes of the currently inserted node from the set of unsorted nodes, wherein each one of the neighboring nodes is separated from the currently inserted node by one of the edges, adding each one of the neighboring nodes as a node-to-be-sorted to the ordered data structure, removing the currently inserted node from the set of unsorted nodes; and providing the ordered sequence of nodes for the placing and routing of the operation unit graph onto the reconfigurable processor.

In Example 2, determining, from the set of unsorted nodes, the node-to-be-sorted in the operation unit graph of Example 1 further comprises determining a set of input nodes in the set of unsorted nodes, wherein input nodes in the set of input nodes exclusively transmit data over the edges to other nodes in the set of unsorted nodes; and determining a set of output nodes in the set of unsorted nodes, wherein output nodes in the set of output nodes exclusively receive data over the edges from other nodes in the set of unsorted nodes.

In Example 3, determining, from the set of unsorted nodes, the node-to-be-sorted in the operation unit graph of Example 2 further comprises: determining a longest path in the operation unit graph, wherein the longest path starts from a first node in the set of input nodes and ends at a second node in the set of output nodes; and selecting the first node or the second node as the node-to-be-sorted.

In Example 4, determining, from the set of unsorted nodes, the node-to-be-sorted in the operation unit graph of Example 2 further comprises: determining a provisioned bandwidth for each edge of the edges that is connected to an input node of the input nodes; and selecting as the node-to-be-sorted the input node among the input nodes that is connected to the edge of the edges with a greatest provisioned bandwidth.

In Example 5, determining, from the set of unsorted nodes, the node-to-be-sorted in the operation unit graph of Example 2 further comprises: determining a provisioned bandwidth for each edge of the edges that is connected to an output node in the set of output nodes; and selecting as the node-to-be-sorted the output node among the output nodes that is connected to the edge of the edges with a greatest provisioned bandwidth.

In Example 6, the ordered data structure of Example 1 comprises at least one of a linked list, a queue, a stack, a tree, or a heap.

In Example 7, adding each one of the neighboring nodes as a node-to-be-sorted to the ordered data structure of Example 1 further comprises: determining a ranking of nodes-to-be-ranked, wherein the nodes-to-be-ranked comprise the neighboring nodes and each node-to-be-sorted in the ordered data structure; rearranging each node-to-be-sorted in the ordered data structure according to the ranking; and inserting each one of the neighboring nodes as a node-to-be-sorted according to the ranking into the ordered data structure.

In Example 8, determining the ranking of the nodes-to-be-ranked of Example 7 further comprises: determining a series of keys for each one of the nodes-to-be-ranked, wherein the ranking of the nodes-to-be-ranked is based on the series of keys.

In Example 9, determining the ranking of the nodes-to-be-ranked of Example 8 further comprises: determining the ranking of the nodes-to-be-ranked based on a first key in the series of keys.

In Example 10, determining the ranking of the nodes-to-be-ranked of Example 9 further comprises: determining whether nodes of the nodes-to-be-ranked have the same first key; and in response to determining that nodes of the nodes-to-be-ranked have the same first key, ranking the nodes of the nodes-to-be-ranked with the same first key among themselves based on subsequent keys in the series of keys.

In Example 11, determining the series of keys for each one of the nodes-to-be-ranked of Example 8 further comprises: determining a key of the series of keys for a current node of the nodes-to-be-ranked based on a cost function of the current node of the nodes-to-be-ranked.

In Example 12, the cost function of the current node of Example 11 is determined based on at least one criterion.

In Example 13, the cost function of the current node of Example 12 is based on a weighted sum of the at least one criterion and at least one additional criterion.

In Example 14, a criterion of the at least one criterion of Example 12 comprises at least one of a number of nodes in the ordered sequence of nodes that is connected to the current node, a maximum bandwidth of all edges connected to the current node, a maximum bandwidth of any edge connected to the current node and another node in the ordered sequence of nodes, a minimum bandwidth of all edges connected to the current node, a minimum bandwidth of any edge connected to the current node and another node in the ordered sequence of nodes, a maximum fanout of the current node, a number of edges that are connected to the current node and part of a virtual channel, or a number of iterations that the current node has been in the ordered data structure while the next node-to-be-sorted has been removed from the ordered data structure.

Example 15 is a sorting tool for determining an ordered sequence of nodes in an operation unit graph for placing and routing the operation unit graph onto a reconfigurable processor, wherein the sorting tool is configured to: receive the operation unit graph comprising a set of unsorted nodes and edges that interconnect nodes in the set of unsorted nodes; determine a first position of the ordered sequence of nodes as a current position of the ordered sequence of nodes; repeat as long as the set of unsorted nodes comprises at least one unsorted node: determine, from the set of unsorted nodes, a node-to-be-sorted in the operation unit graph; add the node-to-be-sorted to an ordered data structure; repeat until the ordered data structure is empty: in order of the ordered data structure, remove a next node-to-be-sorted from the ordered data structure, insert the next node-to-be-sorted as the currently inserted node at the current position of the ordered sequence of nodes, assign a subsequent position of the ordered sequence of nodes as the current position of the ordered sequence of nodes, determine neighboring nodes of the currently inserted node from the set of unsorted nodes, wherein each one of the neighboring nodes is separated from the currently inserted node by one of the edges, add each one of the neighboring nodes as a node-to-be-sorted to the ordered data structure, remove the currently inserted node from the set of unsorted nodes; and provide the ordered sequence of nodes for the placing and routing of the operation unit graph onto the reconfigurable processor.

In Example 16, the sorting tool of Example 15, for adding each one of the neighboring nodes as a node-to-be-sorted to the ordered data structure, is further configured to: determine a ranking of nodes-to-be-ranked, wherein the nodes-to-be-ranked comprise the neighboring nodes and each node-to-be-sorted in the ordered data structure; rearrange each node-to-be-sorted in the ordered data structure according to the ranking; and insert each one of the neighboring nodes as a node-to-be-sorted according to the ranking into the ordered data structure.

In Example 17, the sorting tool of Example 16, for determining the ranking of the nodes-to-be-ranked, is further configured to: determine a series of keys for each one of the nodes-to-be-ranked, wherein the ranking of the nodes-to-be-ranked is based on the series of keys.

In Example 18, the sorting tool of Example 17, for determining the ranking of the nodes-to-be-ranked, is further configured to: determine the ranking of the nodes-to-be-ranked based on a first key in the series of keys; determine whether nodes of the nodes-to-be-ranked have the same first key; and in response to determining that nodes of the nodes-to-be-ranked have the same first key, rank the nodes of the nodes-to-be-ranked with the same first key among themselves based on subsequent keys in the series of keys.

In Example 19. the sorting tool of Example 17, for determining the series of keys for each one of the nodes-to-be-ranked, is further configured to: determine a key of the series of keys for a current node of the nodes-to-be-ranked based on a cost function of the current node of the nodes-to-be-ranked.

Example 20 is a non-transitory computer-readable storage medium including instructions that, when executed by a processing unit, cause the processing unit to operate a sorting tool for determining an ordered sequence of nodes in an operation unit graph for placing and routing the operation unit graph onto a reconfigurable processor, the instructions comprising: receiving the operation unit graph comprising a set of unsorted nodes and edges that interconnect nodes in the set of unsorted nodes; determining a first position of the ordered sequence of nodes as a current position of the ordered sequence of nodes; repeating as long as the set of unsorted nodes comprises at least one unsorted node: determining, from the set of unsorted nodes, a node-to-be-sorted in the operation unit graph; adding the node-to-be-sorted to an ordered data structure; repeating until the ordered data structure is empty: in order of the ordered data structure, removing a next node-to-be-sorted from the ordered data structure, inserting the next node-to-be-sorted as the currently inserted node at the current position of the ordered sequence of nodes, assigning a subsequent position of the ordered sequence of nodes as the current position of the ordered sequence of nodes, determining neighboring nodes of the currently inserted node from the set of unsorted nodes, wherein each one of the neighboring nodes is separated from the currently inserted node by one of the edges, adding each one of the neighboring nodes as a node-to-be-sorted to the ordered data structure, removing the currently inserted node from the set of unsorted nodes; and providing the ordered sequence of nodes for the placing and routing of the operation unit graph onto the reconfigurable processor.

What is claimed is:

1. A method of operating a compiler that is executable in one or more processors coupled to a storage medium comprising:
   receiving an operation unit graph comprising a set of unsorted nodes and edges that interconnect nodes in the set of unsorted nodes;
   determining a first position of an ordered sequence of nodes as a current position of the ordered sequence of nodes;
   repeating as long as the set of unsorted nodes comprises at least one unsorted node:
   determining, from the set of unsorted nodes, a node-to-be-sorted in the operation unit graph;
   adding the node-to-be-sorted to an ordered data structure; and
   repeating until the ordered data structure is empty:
   in order of the ordered data structure, removing a next node-to-be-sorted from the ordered data structure,
   inserting the next node-to-be-sorted as the currently inserted node at the current position of the ordered sequence of nodes,
   assigning a subsequent position of the ordered sequence of nodes as the current position of the ordered sequence of nodes,
   determining neighboring nodes of the currently inserted node from the set of unsorted nodes, wherein each one of the neighboring nodes is separated from the currently inserted node by one of the edges,
   adding each one of the neighboring nodes as a node-to-be-sorted to the ordered data structure, and
   removing the currently inserted node from the set of unsorted nodes;
   receiving a hardware description describing a reconfigurable processor having interconnects, physical compute units and/or physical memory units;
   using the hardware description to determine an assignment of the edges and nodes of the ordered sequence of nodes onto the interconnects, the physical compute units and/or the physical memory units of the reconfigurable processor during placement and routing of the operation unit graph; and
   generating a configuration file that is adapted for being applied to the reconfigurable processor for configuring the reconfigurable processor with the assignment of the edges and the nodes of the ordered sequence of nodes onto the interconnects, the physical compute units and/or the physical memory units.

2. The method of claim 1, wherein determining, from the set of unsorted nodes, the node-to-be-sorted in the operation unit graph further comprises:
   determining a set of input nodes in the set of unsorted nodes, wherein input nodes in the set of input nodes exclusively transmit data over the edges to other nodes in the set of unsorted nodes; and
   determining a set of output nodes in the set of unsorted nodes, wherein output nodes in the set of output nodes exclusively receive data over the edges from other nodes in the set of unsorted nodes.

3. The method of claim 2, wherein determining, from the set of unsorted nodes, the node-to-be-sorted in the operation unit graph further comprises:
   determining a longest path in the operation unit graph, wherein the longest path starts from a first node in the set of input nodes and ends at a second node in the set of output nodes; and
   selecting the first node or the second node as the node-to-be-sorted.

4. The method of claim 2, wherein determining, from the set of unsorted nodes, the node-to-be-sorted in the operation unit graph further comprises:
   determining a provisioned bandwidth for each edge of the edges that is connected to an input node of the input nodes; and
   selecting as the node-to-be-sorted the input node among the input nodes that is connected to the edge of the edges with a greatest provisioned bandwidth.

5. The method of claim 2, wherein determining, from the set of unsorted nodes, the node-to-be-sorted in the operation unit graph further comprises:
   determining a provisioned bandwidth for each edge of the edges that is connected to an output node in the set of output nodes; and
   selecting as the node-to-be-sorted the output node among the output nodes that is connected to the edge of the edges with a greatest provisioned bandwidth.

6. The method of claim 1, wherein the ordered data structure comprises at least one of a linked list, a queue, a stack, a tree, or a heap.

7. The method of claim 1, wherein adding each one of the neighboring nodes as a node-to-be-sorted to the ordered data structure further comprises:
   determining a ranking of nodes-to-be-ranked, wherein the nodes-to-be-ranked comprise the neighboring nodes and each node-to-be-sorted in the ordered data structure;
   rearranging each node-to-be-sorted in the ordered data structure according to the ranking; and
   inserting each one of the neighboring nodes as a node-to-be-sorted according to the ranking into the ordered data structure.

8. The method of claim 7, wherein determining the ranking of the nodes-to-be-ranked further comprises:
   determining a series of keys for each one of the nodes-to-be-ranked, wherein the ranking of the nodes-to-be-ranked is based on the series of keys.

9. The method of claim 8, wherein determining the ranking of the nodes-to-be-ranked further comprises:
   determining the ranking of the nodes-to-be-ranked based on a first key in the series of keys.

10. The method of claim 9, wherein determining the ranking of the nodes-to-be-ranked further comprises:
    determining whether nodes of the nodes-to-be-ranked have the same first key; and
    in response to determining that nodes of the nodes-to-be-ranked have the same first key, ranking the nodes of the nodes-to-be-ranked with the same first key among themselves based on subsequent keys in the series of keys.

11. The method of claim 8, wherein determining the series of keys for each one of the nodes-to-be-ranked further comprises:

determining a key of the series of keys for a current node of the nodes-to-be-ranked based on a cost function of the current node of the nodes-to-be-ranked.

12. The method of claim 11, wherein the cost function of the current node is determined based on at least one criterion.

13. The method of claim 12, wherein the cost function of the current node is based on a weighted sum of the at least one criterion and at least one additional criterion.

14. The method of claim 12, wherein a criterion of the at least one criterion comprises at least one of
a number of nodes in the ordered sequence of nodes that is connected to the current node,
a maximum bandwidth of all edges connected to the current node,
a maximum bandwidth of any edge connected to the current node and another node in the ordered sequence of nodes,
a minimum bandwidth of all edges connected to the current node,
a minimum bandwidth of any edge connected to the current node and another node in the ordered sequence of nodes,
a maximum fanout of the current node,
a number of edges that are connected to the current node and part of a virtual channel, or
a number of iterations that the current node has been in the ordered data structure while the next node-to-be-sorted has been removed from the ordered data structure.

15. A system, comprising:
one or more host processors coupled to a storage medium; and
a compiler executable in any one of the one or more host processors, wherein the compiler is configured to:
receive an operation unit graph comprising a set of unsorted nodes and edges that interconnect nodes in the set of unsorted nodes;
determine a first position of an ordered sequence of nodes as a current position of the ordered sequence of nodes;
repeat as long as the set of unsorted nodes comprises at least one unsorted node:
determine, from the set of unsorted nodes, a node-to-be-sorted in the operation unit graph;
add the node-to-be-sorted to an ordered data structure; and
repeat until the ordered data structure is empty:
in order of the ordered data structure, remove a next node-to-be-sorted from the ordered data structure,
insert the next node-to-be-sorted as the currently inserted node at the current position of the ordered sequence of nodes,
assign a subsequent position of the ordered sequence of nodes as the current position of the ordered sequence of nodes,
determine neighboring nodes of the currently inserted node from the set of unsorted nodes, wherein each one of the neighboring nodes is separated from the currently inserted node by one of the edges,
add each one of the neighboring nodes as a node-to-be-sorted to the ordered data structure, and
remove the currently inserted node from the set of unsorted nodes;
receive a hardware description describing a reconfigurable processor having interconnects, physical compute units and/or physical memory units;
use the hardware description and the ordered sequence of nodes to determine an assignment of the edges and nodes of the ordered sequence of nodes onto the interconnects, the physical compute units and/or the physical memory units during placement and routing of the operation unit graph; and
generating a configuration file that is adapted for being applied to the reconfigurable processor for configuring the reconfigurable processor with the assignment of the edges and the nodes of the ordered sequence of nodes onto the interconnects, the physical compute units and/or the physical memory units.

16. The system of claim 15, wherein the compiler, for adding each one of the neighboring nodes as a node-to-be-sorted to the ordered data structure, is further configured to:
determine a ranking of nodes-to-be-ranked, wherein the nodes-to-be-ranked comprise the neighboring nodes and each node-to-be-sorted in the ordered data structure;
rearrange each node-to-be-sorted in the ordered data structure according to the ranking; and
insert each one of the neighboring nodes as a node-to-be-sorted according to the ranking into the ordered data structure.

17. The system of claim 16, wherein the compiler, for determining the ranking of the nodes-to-be-ranked, is further configured to:
determine a series of keys for each one of the nodes-to-be-ranked, wherein the ranking of the nodes-to-be-ranked is based on the series of keys.

18. The sorting tool system of claim 17, wherein the compiler, for determining the ranking of the nodes-to-be-ranked, is further configured to:
determine the ranking of the nodes-to-be-ranked based on a first key in the series of keys;
determine whether nodes of the nodes-to-be-ranked have the same first key; and
in response to determining that nodes of the nodes-to-be-ranked have the same first key, rank the nodes of the nodes-to-be-ranked with the same first key among themselves based on subsequent keys in the series of keys.

19. The system of claim 17, wherein the compiler, for determining the series of keys for each one of the nodes-to-be-ranked, is further configured to:
determine a key of the series of keys for a current node of the nodes-to-be-ranked based on a cost function of the current node of the nodes-to-be-ranked.

20. A non-transitory computer-readable storage medium including instructions that, when executed by a processing unit, cause the processing unit to operate a compiler, the instructions comprising:
receiving an operation unit graph comprising a set of unsorted nodes and edges that interconnect nodes in the set of unsorted nodes;
determining a first position of an ordered sequence of nodes as a current position of the ordered sequence of nodes;
repeating as long as the set of unsorted nodes comprises at least one unsorted node:
determining, from the set of unsorted nodes, a node-to-be-sorted in the operation unit graph;
adding the node-to-be-sorted to an ordered data structure; and
repeating until the ordered data structure is empty:
in order of the ordered data structure, removing a next node-to-be-sorted from the ordered data structure, inserting the next node-to-be-sorted as the currently inserted node at the current position of the ordered sequence of nodes, assigning a subsequent position of the ordered sequence of nodes as the current position of the ordered sequence of nodes, determining neighboring nodes of the currently inserted node from the set of unsorted nodes, wherein each one of the neighboring nodes is separated from the currently inserted node by one of the edges, adding each one of the neighboring nodes as a node-to-be-sorted to the ordered data structure, and removing the currently inserted node from the set of unsorted nodes; and receiving a hardware description describing a reconfigurable processor having interconnects, physical compute units and/or physical memory units;

using the hardware description to determine an assignment of the edges and nodes of the ordered sequence of nodes onto the interconnects, the physical compute units and/or the physical memory units of the reconfigurable processor during placement and routing of the operation unit graph; and generating a configuration file that is adapted for being applied to the reconfigurable processor for configuring the reconfigurable processor with the assignment of the edges and the nodes of the ordered sequence of nodes onto the interconnects, the physical compute units and/or the physical memory units.

* * * * *